(12) United States Patent
Shibayama et al.

(10) Patent No.: US 10,705,567 B1
(45) Date of Patent: Jul. 7, 2020

(54) DOCKING DEVICE

(71) Applicant: LENOVO (SINGAPORE) PTE. LTD., Singapore (SG)

(72) Inventors: Yoshiyuki Shibayama, Yokohama (JP); Shigeki Mori, Yokohama (JP); Toshihiro Inoue, Yokohama (JP); Eiji Shinohara, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/600,136

(22) Filed: Oct. 11, 2019

(30) Foreign Application Priority Data

Aug. 1, 2019 (JP) ................................. 2019-142537

(51) Int. Cl.
*G06F 1/16* (2006.01)

(52) U.S. Cl.
CPC ................................. *G06F 1/1632* (2013.01)

(58) Field of Classification Search
CPC ....................................................... H05K 5/00
See application file for complete search history.

(56) References Cited

U.S. PATENT DOCUMENTS 7,472,215 B1 * 12/2008 Mok ..................... G06F 1/1632
710/304
2016/0154431 A1 * 6/2016 Vroom ..................... G05B 9/02
361/679.41

FOREIGN PATENT DOCUMENTS

JP          2019061652 A        4/2019

* cited by examiner

*Primary Examiner* — Jerry Wu
(74) *Attorney, Agent, or Firm* — Shimokaji IP

(57) ABSTRACT

An electronic apparatus includes a portable information apparatus and the docking device. The docking device includes an impact sound generation mechanism that generates an impact sound when the portable information apparatus is placed on an apparatus placement portion. The impact sound generation mechanism includes: a detector configured to detect that the portable information apparatus is placed on the apparatus placement portion.

8 Claims, 13 Drawing Sheets

DOCKING DEVICE

FIELD OF THE INVENTION

The present invention relates to a docking device capable of docking and undocking a portable information apparatus.

BACKGROUND OF THE INVENTION

Portable information apparatuses configured to be lightweight and compact in terms of portability are often limited in their functions. For example, there are cases where notebook type personal computers (laptop PCs) are limited in their functions to achieve a reduction in weight and thickness. For such a laptop PC, a docking device is provided as a dedicated device to expand the function of the laptop PC. The docking device is configured to be connected to the laptop PC via a connector to expand the function of the laptop PC. For example, in Japanese Unexamined Patent Application Publication No. 2019-61652, the present applicant has proposed a docking device including engaging members having hook portions that can engage with and disengage from an engaging hole of a portable information apparatus.

SUMMARY OF THE INVENTION

In the meantime, in order to enable a user to surely recognize the completion of the docking, it is preferable that the docking device, for example, generate an impact sound like a click sound upon the occurrence of the docking. It is necessary that such an impact sound be generated when the portable information apparatus is placed at a predetermined mounting position of the docking device. This is because if the impact sound is generated in the state in which the portable information apparatus is improperly placed, there is a possibility that the user erroneously recognizes it as the completion of the docking, resulting in a hindrance to use thereafter. Further, when an impact sound generator is provided to the docking device, there arises a problem that the number of components of the docking device increases to push up its manufacturing cost.

The present invention has been made in view of the above-described problems of the related art and has an object to provide a docking device that enables a user to recognize the completion of docking, while suppressing the manufacturing cost of the docking device.

A first aspect of the present invention relates to a docking device capable of docking a portable information apparatus having an outer wall formed with an engaging hole. The docking device includes: a device chassis having an apparatus placement portion for placement of the portable information apparatus; an engaging member having a hook portion projecting from a surface of the apparatus placement portion and configured to engage with and disengage from the engaging hole of the portable information apparatus, the hook portion being movable between an engagement position at which the hook portion engages with the engaging hole and an engagement release position at which a state of engagement of the hook portion with the engaging hole is released; and an impact sound generation mechanism configured to generate an impact sound when the portable information apparatus is placed on the apparatus placement portion and the engaging member is disposed at a position engageable with the engaging hole or at the engagement position. The impact sound generation mechanism includes: a detector configured to detect that the portable information apparatus is placed on the apparatus placement portion; a slide member provided to be slidable in the device chassis in a first direction and a second direction opposite to the first direction and configured to slide in the first direction when the portable information apparatus is detected by the detector; a movable member having a receiving portion configured to be pressed by a pressing piece of the slide member sliding in the first direction, the movable member provided to be movable in the device chassis; a guide hole provided to one of the movable member and the device chassis; a guide pin provided to the other of the movable member and the device chassis and inserted in the guide hole to be slidable relative to the guide hole; an elastic member having one end attached to the device chassis and the other end attached to the movable member, the other end disposed at a position farther from the slide member than the one end so that the elastic member is disposed in a posture in which an expansion/contraction direction of the elastic member is inclined relative to a sliding direction of the slide member; and a hitting base provided to the device chassis and configured to be hit by a hitting portion provided to an outer surface of the movable member. In the impact sound generation mechanism, when the portable information apparatus is detected by the detector, the slide member slides in the first direction to cause the pressing piece to press the receiving portion to move the movable member against an urging force of the elastic member, and then when the pressing piece disengages from the receiving portion, the movable member moves along the guide pin by receiving the urging force of the elastic member so that the hitting portion hits the hitting base to generate the impact sound.

A second aspect of the present invention relates to a docking device capable of docking a portable information apparatus. The docking device includes: a device chassis having an apparatus placement portion for placement of the portable information apparatus; a connection mechanism portion that rises at a side portion of the apparatus placement portion and is disposed to face a side surface of the portable information apparatus placed on the apparatus placement portion; a first engaging member having a hook portion projecting from a surface of the apparatus placement portion and configured to engage with and disengage from a first engaging hole provided to a bottom surface of the portable information apparatus, the hook portion being movable between an engagement position at which the hook portion engages with the first engaging hole and an engagement release position at which a state of engagement of the hook portion with the first engaging hole is released; a second engaging member having a hook portion projecting from the surface of the apparatus placement portion and configured to engage with and disengage from a second engaging hole provided to the bottom surface of the portable information apparatus, the hook portion being movable between an engagement position at which the hook portion engages with the second engaging hole and an engagement release position at which a state of engagement of the hook portion with the second engaging hole is released; and an impact sound generation mechanism configured to generate an impact sound when the portable information apparatus is placed on the apparatus placement portion. The first engaging member is provided at a position farther from the connection mechanism portion than the second engaging member. The impact sound generation mechanism is provided at a position closer to the first engaging member than to the second engaging member. The impact sound generation mechanism is configured to generate the impact sound when the portable information apparatus is placed on the apparatus placement portion and the first engaging member is disposed at a position engageable with the first engaging hole or at the engagement position.

The above-described aspects of the present invention enable a user to recognize the completion of docking of a portable information apparatus to a docking device, while suppressing the manufacturing cost of the docking device.

DETAILED DESCRIPTION OF THE INVENTION

Hereinafter, referring to the accompanying drawings, a docking device according to the present invention will be described in detail by way of an embodiment that is preferable in relation to a portable information apparatus configured to be docked to and undocked from the docking device.

Figure 1:
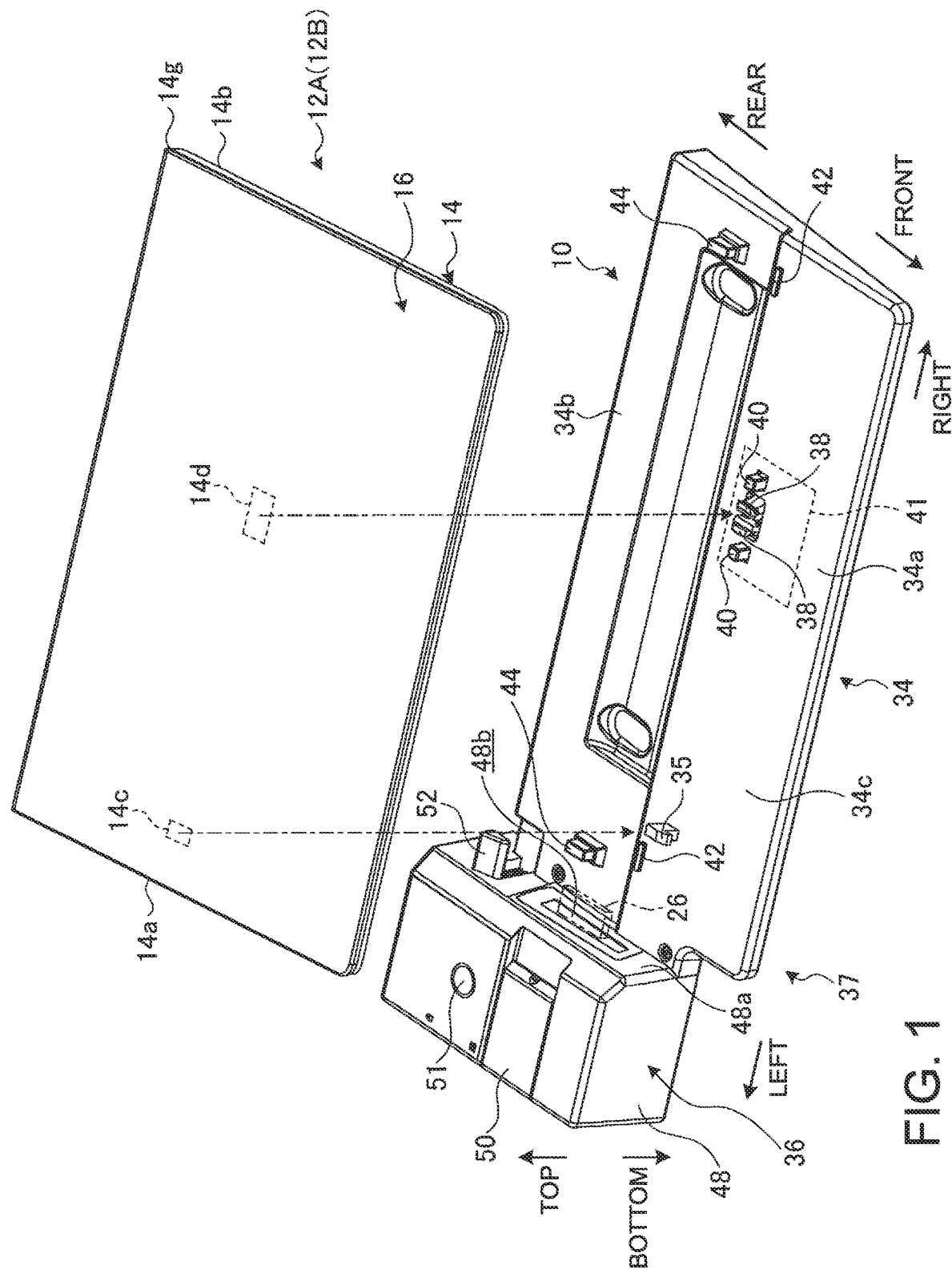
FIG. 1 is an exploded perspective view illustrating the operation of docking a portable information apparatus to a docking device according to an embodiment of the present invention.
Figure 2A:
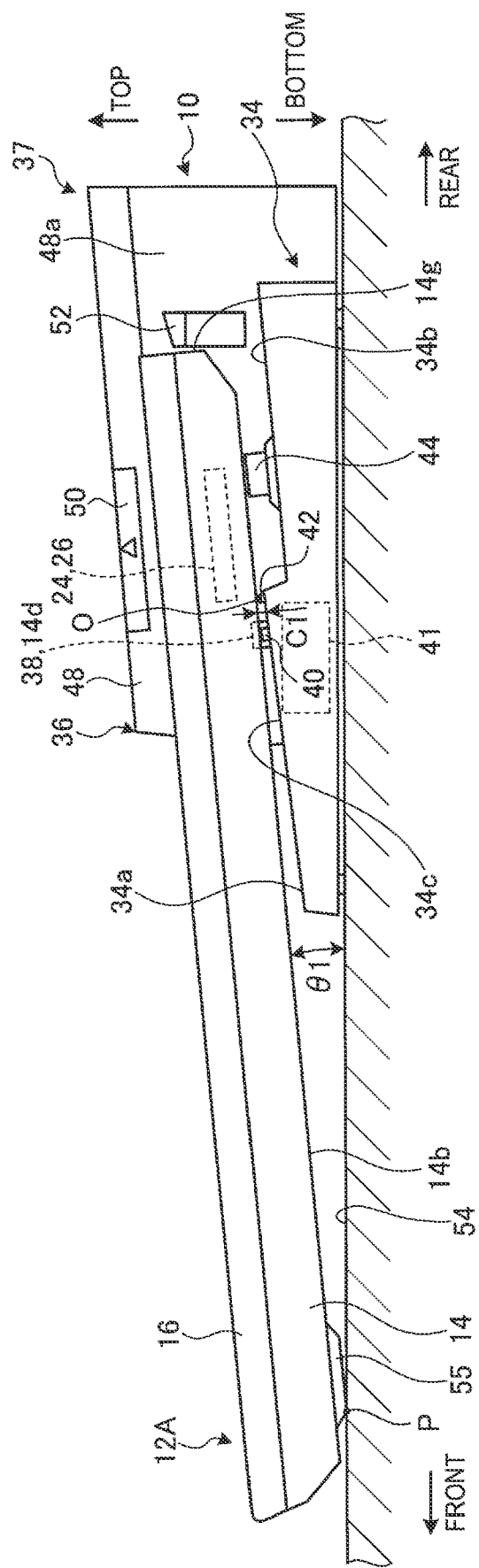
FIG. 2A is a side view schematically illustrating a state in which the portable information apparatus illustrated in FIG. 1 is docked to the docking device.
Figure 2B:
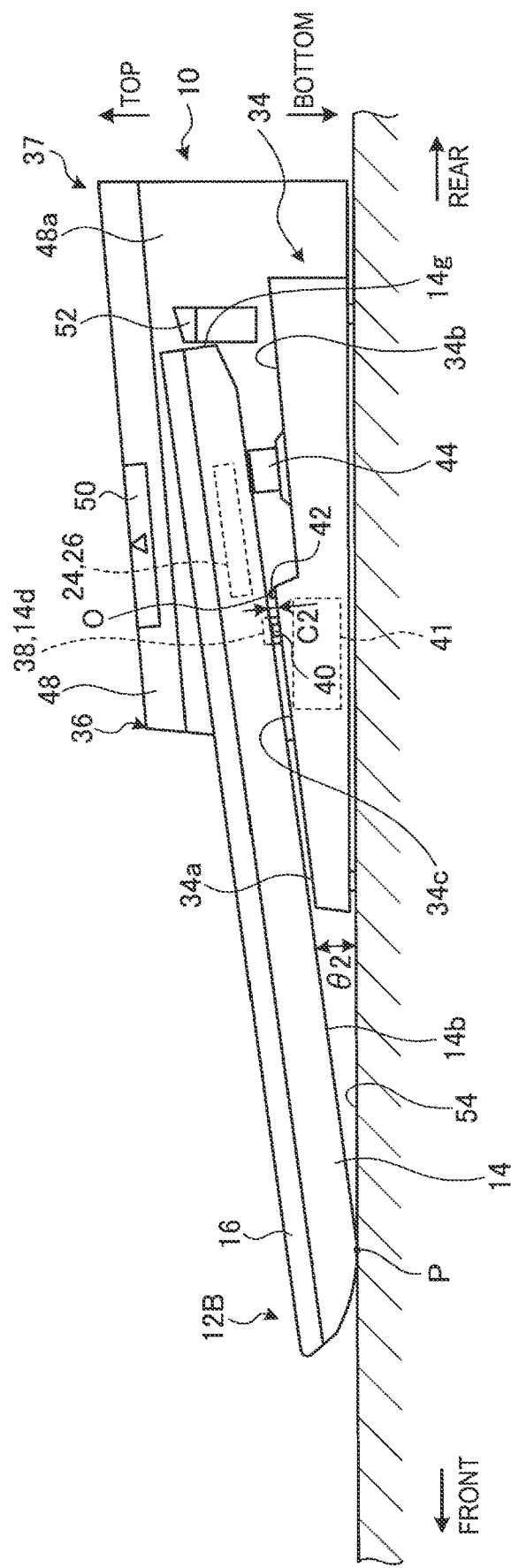
FIG. 2B is a side view schematically illustrating a state in which a portable information apparatus having a specification different from that of the portable information apparatus illustrated in FIG. 2A is docked to the docking device.

FIG. 1 is an exploded perspective view illustrating the operation of docking a portable information apparatus 12A to a docking device 10 according to an embodiment of the present invention. FIG. 2A is a side view schematically illustrating a state in which the portable information apparatus 12A illustrated in FIG. 1 is docked to the docking device 10. FIG. 2B is a side view schematically illustrating a state in which a portable information apparatus 12B having a specification different from that of the portable information apparatus 12A illustrated in FIG. 2A is docked to the docking device 10.

The docking device 10 of this embodiment is capable of docking and undocking the portable information apparatus 12A or 12B which is, for example, a laptop PC. The portable information apparatus 12A and the portable information apparatus 12B differ from each other at least in external shape. While the docking device 10 is capable of docking and undocking a plurality of types of portable information apparatuses in addition to the portable information apparatuses 12A and 12B, a description will be representatively given below of the cases where the two types of the portable information apparatuses 12A and 12B are docked and undocked. The docking device 10 may be configured to be capable of docking and undocking only the portable information apparatus 12A or the portable information apparatus 12B. The docking device 10 is configured to expand the function of the portable information apparatus 12A or 12B docked thereto, for example, by connecting it to a plurality of peripheral devices or a network. Therefore, an electronic apparatus formed by docking the portable information apparatus 12A or 12B to the docking device 10 has higher functionality than the portable information apparatus 12A or 12B alone. The docking device 10 can also be used for the expansion of a portable information apparatus other than a laptop PC and may be used for expanding the function of, for example, a tablet PC, a mobile phone, a smartphone, or an electronic organizer.

Hereinafter, taking as a reference the state in which the portable information apparatus 12A (12B) is mounted on the docking device 10, a description will be given by referring to the near side in FIG. 1 as front, the far side as rear, the thickness direction of the docking device 10 and the portable information apparatus 12A (12B) as top-bottom, and the width direction as left-right.

As illustrated in FIG. 2A, the portable information apparatus 12A as one example of an object to be connected to the docking device 10 is configured such that a display chassis 16 is pivotally coupled to an apparatus chassis 14 via hinges. In the portable information apparatus 12A, a keyboard is provided on a top surface of the apparatus chassis 14, and a display is provided on a bottom surface of the display chassis 16. A connection terminal 24 is provided on a left surface (a side surface 14a) of the apparatus chassis 14 (see also FIG. 3A).

The connection terminal 24 is disposed at a position near a rear end of the side surface 14a. The connection terminal 24 may be configured such that, for example, a plurality of connection terminals is arranged in parallel in the front-rear direction. A connector 26 (see FIGS. 3A and 3B) of the docking device 10 can be connected to the connection terminal 24. By connecting the connector 26 to the connection terminal 24, the docking device 10 is electrically connected to the portable information apparatus 12A. This enables the portable information apparatus 12A to use various expanded functions installed in the docking device 10. The connector 26 and the connection terminal 24 conform to a connection standard in compliance with, for example, the universal serial bus (USB) standard.

As described above, the docking device 10 of this embodiment is also capable of docking and undocking the portable information apparatus 12B having a specification in which the dimension in the front-rear direction differs from that of the portable information apparatus 12A illustrated in FIG. 2A. As illustrated in FIG. 2B, the portable information apparatus 12B as another example of an object to be connected to the docking device 10 has the same structure as the portable information apparatus 12A illustrated in FIG. 2A except for the dimension in the front-rear direction and the thickness dimension. The same reference symbols will be assigned to components of the portable information apparatus 12B illustrated in FIG. 2B that are the same as or similar to those of the portable information apparatus 12A illustrated in FIG. 2A, thereby omitting a detailed description thereof. The dimension of the portable information apparatus 12B in the front-rear direction is shorter than that of the portable information apparatus 12A. In the portable information apparatus 12A and the portable information apparatus 12B, the intervals each from a rear end face 14g to the connection terminal 24 are set to be the same or substantially the same.

As illustrated in FIGS. 1 to 2B, the docking device 10 is used in the state in which the apparatus chassis 14 of the portable information apparatus 12A (12B) is placed thereon. The docking device 10 includes a device chassis 37 composed of an apparatus placement portion 34 and a connection mechanism portion 36.

The apparatus placement portion 34 is, for example, a thin box made of a resin or the like and having a top surface with a size that enables approximately the rear half of the portable information apparatus 12A or 12B to be placed thereon. The apparatus placement portion 34 includes a placement base 34a on which a bottom surface 14b of the portable information apparatus 12A or 12B is placed. The placement base 34a has an inclined surface that is inclined such that the height dimension gradually increases from the front toward the rear. A relief portion 34b that is formed to be lower than the placement base 34a by one step is provided rearward of the placement base 34a. The relief portion 34b is a recess for avoiding a battery or the like, not illustrated, in the case where the battery or the like projects from the rear bottom surface of the portable information apparatus 12A or 12B.

An engaging member 35, a pair of engaging members 38 and a pair of detectors 40 are provided to project from a top surface 34c of the placement base 34a. The engaging member 35 is disposed rightward of the connection mechanism portion 36, i.e. at a position on the left of the top surface 34c. The engaging members 38 and the detectors 40 are disposed at positions farther from the connection mechanism portion 36 than the engaging member 35, for example, at positions slightly rightward of the center of the top surface 34c. The engaging member 38 and the detector 40 on the left and the engaging member 38 and the detector 40 on the right are disposed to be opposed to each other and to be laterally symmetrical to each other.

The engaging member 35 can engage with and disengage from an engaging hole 14c provided in the bottom surface 14b of the portable information apparatus 12A or 12B. The pair of engaging members 38 can simultaneously engage with or disengage from an engaging hole 14d provided in the bottom surface 14b of the portable information apparatus 12A or 12B. By the engagement of the engaging member 35 with the engaging hole 14c and the engagement of the engaging members 38 with the engaging hole 14d, the portable information apparatus 12A or 12B is prevented from coming off the apparatus placement portion 34 in the top-bottom direction. In other words, the engaging member 35 and the engaging members 38 respectively form coupling mechanisms for detachably coupling the portable information apparatus 12A or 12B to the docking device 10. The detectors 40 move up or down by being pressed by the bottom surface 14b of the portable information apparatus 12A or 12B placed on the placement base 34a. The detectors 40 detect the clearance (the distance in the top-bottom direction) between the bottom surface 14b of the portable information apparatus 12A or 12B and the top surface 34c of the placement base 34a at the positions where the engaging members 38 are provided, so as to function as a position adjuster for adjusting the up-down positions of the engaging members 38. Further, the detectors 40 detect the placement of the portable information apparatus 12A or 12B on the placement base 34a so as to function as a trigger to operate an impact sound generation mechanism 41 which will be described later.

The placement base 34a is provided with leg members 42 at both left and right ends of the top surface 34c to support the bottom surface 14b of the portable information apparatus 12A or 12B. The left and right leg members 42 are arranged in the left-right direction such that the positions thereof in the front-rear direction on the top surface 34c of the placement base 34a coincide or substantially coincide with each other. The leg members 42 are each, for example, a prismatic projection extending in the left-right direction and are made of a resin, a hard rubber, or the like.

The relief portion 34b is provided with rear support legs 44 at both left and right ends of its top surface 34c. The rear support legs 44 support rear end portions of the bottom surface 14b of the portable information apparatus 12A or 12B placed on the placement base 34a. The rear support legs 44 are, for example, provided to be movable up and down, and support the portable information apparatus 12A or 12B at a predetermined raised position by elastic members, stopper mechanisms, or the like, not illustrated.

The connection mechanism portion 36 includes a rectangular parallelepiped box 48 made of a resin or the like. The box 48 has a height dimension greater than that of the apparatus placement portion 34. The box 48 has a side wall 48a that rises upright at a side portion of the apparatus placement portion 34 and faces the side surface 14a of the portable information apparatus 12A or 12B placed on the apparatus placement portion 34. The side wall 48a comes in contact with the side surface 14a of the portable information apparatus 12A or 12B placed on the apparatus placement portion 34 so as to position the portable information apparatus 12A or 12B in the left-right direction. The connector 26 can advance or retract in the left-right direction from an opening 48b formed in the side wall 48a toward the side surface 14a of the portable information apparatus 12A or 12B.

An operating lever 50 and a power button 51 are provided on a top surface of the box 48. The operating lever 50 is an operating portion for advancing or retracting the connector 26 through the opening 48b. The power button 51 is a button for turning on/off the power of the docking device 10.

The connection mechanism portion 36 includes a positioning member 52 rearward of the opening 48b. The positioning member 52 projects rightward from the side wall 48a. The positioning member 52 comes in contact with the rear end face 14g of the portable information apparatus 12A or 12B placed on the apparatus placement portion 34 so as to position the portable information apparatus 12A or 12B in the front-rear direction. The positioning member 52 is provided to be vertically movable so as not to interfere with the opening/closing operation of the display chassis 16 and is, normally, elastically urged upward.

As illustrated in FIGS. 2A and 2B, the docking device 10 is usually used by being placed on a planar use surface 54 such as a top surface of a desk. When the portable information apparatus 12A or 12B is docked to the docking device 10, its front end side comes in contact with and is supported by the use surface 54 and its rear end side comes in contact with and is supported by the leg members 42 on the placement base 34a so that the portable information apparatus 12A or 12B takes a posture at an angle with its front end side inclined downward. In the case of this embodiment, the positions where the bottom surface 14b of the portable information apparatus 12A or 12B comes in contact with the left and right leg members 42 are defined as reference points O of the mounting position of the portable information apparatus 12A or 12B with respect to the docking device 10. Using the reference points O as the reference, a landing point P of the bottom surface 14b lands on the use surface 54 so that the portable information apparatus 12A or 12B is stabilized with its front end side inclined downward. In the portable information apparatus 12A illustrated in FIG. 2A, a front rubber leg 55 provided on the bottom surface 14b gives the landing point P.

In the meantime, the portable information apparatus 12A and the portable information apparatus 12B differ from each other in dimension in the front-rear direction. Therefore, the distance from the reference point O to the landing point P of the portable information apparatus 12B is smaller than that of the portable information apparatus 12A (see FIG. 2B). Note that the rear end face 14g of each of the portable information apparatuses 12A and 12B is positioned in the front-rear direction by the positioning member 52. As a result, in each of the portable information apparatuses 12A and 12B, its front end side vertically pivots to swing about the reference points O on the rear end side as the reference so that the landing point P lands on the use surface 54.

Therefore, a placement angle θ1 (see FIG. 2A) of the portable information apparatus 12A is smaller than a placement angle θ2 (see FIG. 2B) of the portable information apparatus 12B. As a result, a clearance C1 between the bottom surface 14b of the portable information apparatus 12A and the top surface 34c of the placement base 34a at the position where the engaging members 38 are provided forward of the reference points O is greater than a clearance C2 between the bottom surface 14b of the portable information apparatus 12B and the top surface 34c of the placement base 34a.

In view of this, the docking device 10 of this embodiment includes a position adjusting mechanism 56 that moves up or down the engaging members 38 according to the clearances C1 and C2 that differ from each other due to the difference in front-rear dimension between the portable information apparatuses 12A and 12B, thereby adjusting the engaging members 38 to the positions where the engaging members 38 can securely engage with the engaging hole 14d. Note that, for example, in the case where the docking device 10 is not subjected to switching between the clearances C1 and C2, such as in the case where the docking device 10 is configured for exclusive use with portable information apparatuses of the same specification, the position adjusting mechanism 56 may be omitted. The engaging member 35 may also be configured to be adjustable to a desired up-down position by a mechanism similar to the position adjusting mechanism 56.

Next, a description will be given of the configurations of the engaging members 38 and the detectors 40 and the configuration of a sliding mechanism 58 that slides the connector 26 toward the portable information apparatus 12A or 12B.

Figure 3A:
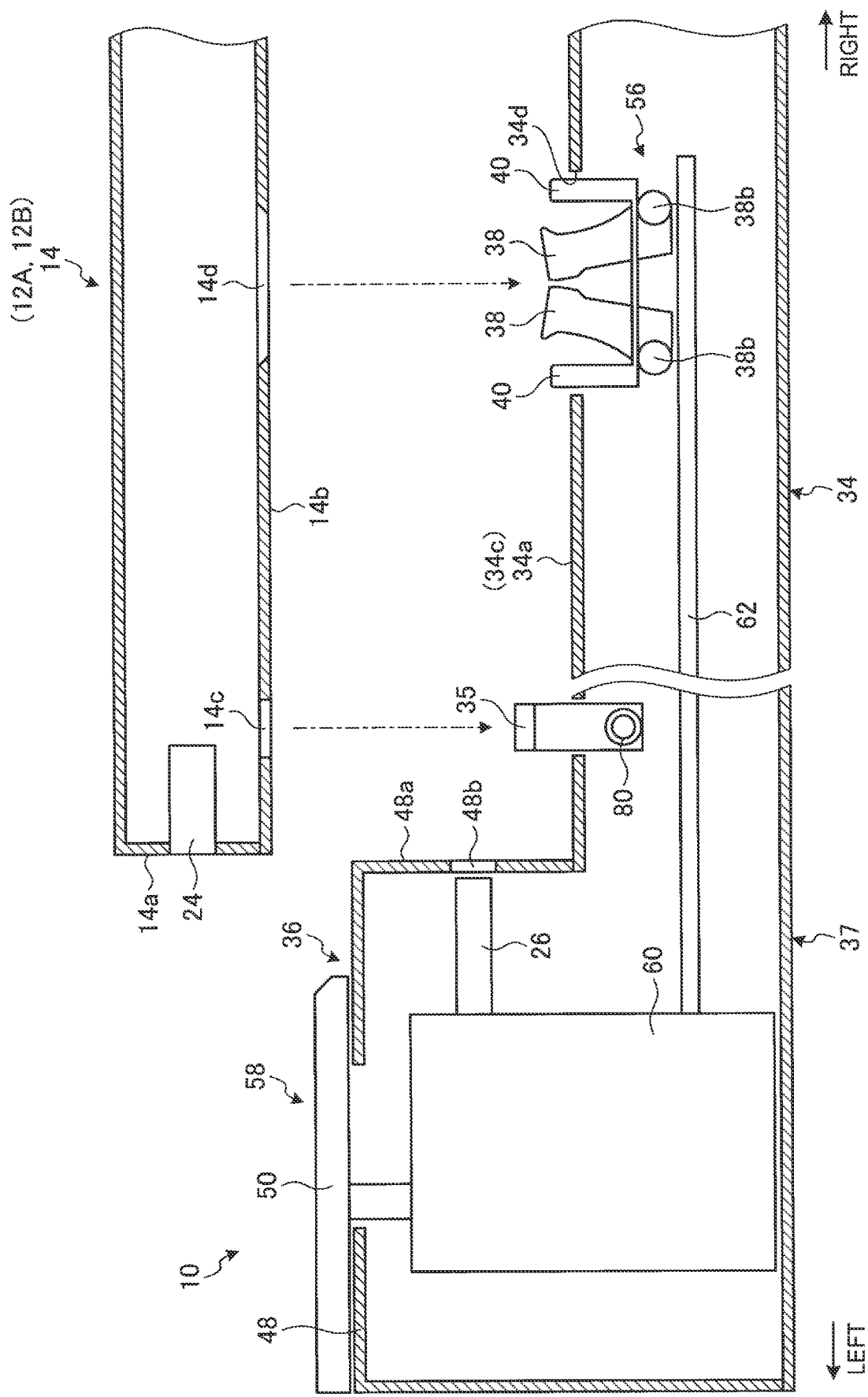
FIG. 3A is a side sectional view schematically illustrating the internal structure of the docking device in the state in which the portable information apparatus is not docked.
Figure 3B:
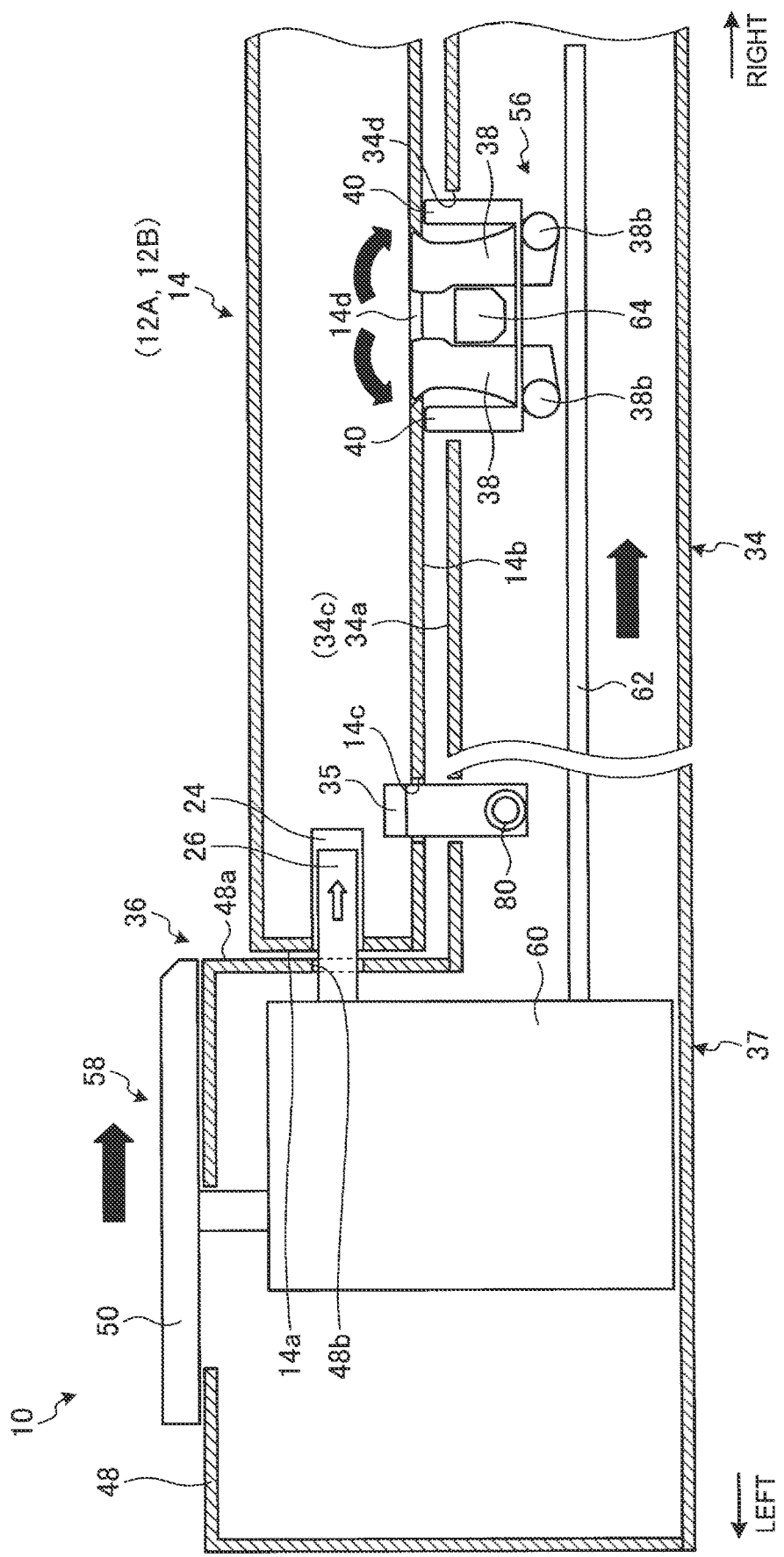
FIG. 3B is a side sectional view schematically illustrating the internal structure of the docking device in the state in which the portable information apparatus is docked.

FIG. 3A is a side sectional view schematically illustrating the internal structure of the docking device 10 in the state in which the portable information apparatus 12A or 12B is not docked. FIG. 3B is a side sectional view schematically illustrating the internal structure of the docking device 10 in the state in which the portable information apparatus 12A or 12B is docked. In FIGS. 3A and 3B, the portable information apparatus 12A or 12B is illustrated only with the apparatus chassis 14, and illustration of the impact sound generation mechanism 41 and so on is omitted.

First, a configuration example of the sliding mechanism 58 will be described. As illustrated in FIGS. 3A and 3B, the sliding mechanism 58 includes the operating lever 50 and a slide base 60.

The operating lever 50 is provided to be slidable in the left-right direction on a top surface of the box 48. The operating lever 50 is coupled to the slide base 60 via a bar-like member protruding from a bottom surface of the operating lever 50. The connector 26 is protrusively provided on a right surface of the slide base 60 via, for example, a floating mechanism or the like, not illustrated. A left-right slider 62 is fixed to the right surface of the slide base 60. The left-right slider 62 is a lengthy plate-like member extending rightward in the device chassis 37 to reach the engaging members 38. The left-right slider 62 is formed at its distal end with a later-described elongated hole 76 (see FIGS. 5A and 5B).

In the sliding mechanism 58, when the operating lever 50 is slid in the left-right direction, the slide base 60 slides in the left-right direction. As a result, the connector 26 advances or retracts in the left-right direction to appear or disappear through the opening 48b. In this event, as the slide base 60 slides, the left-right slider 62 also slides in the left-right direction.

Figure 4:
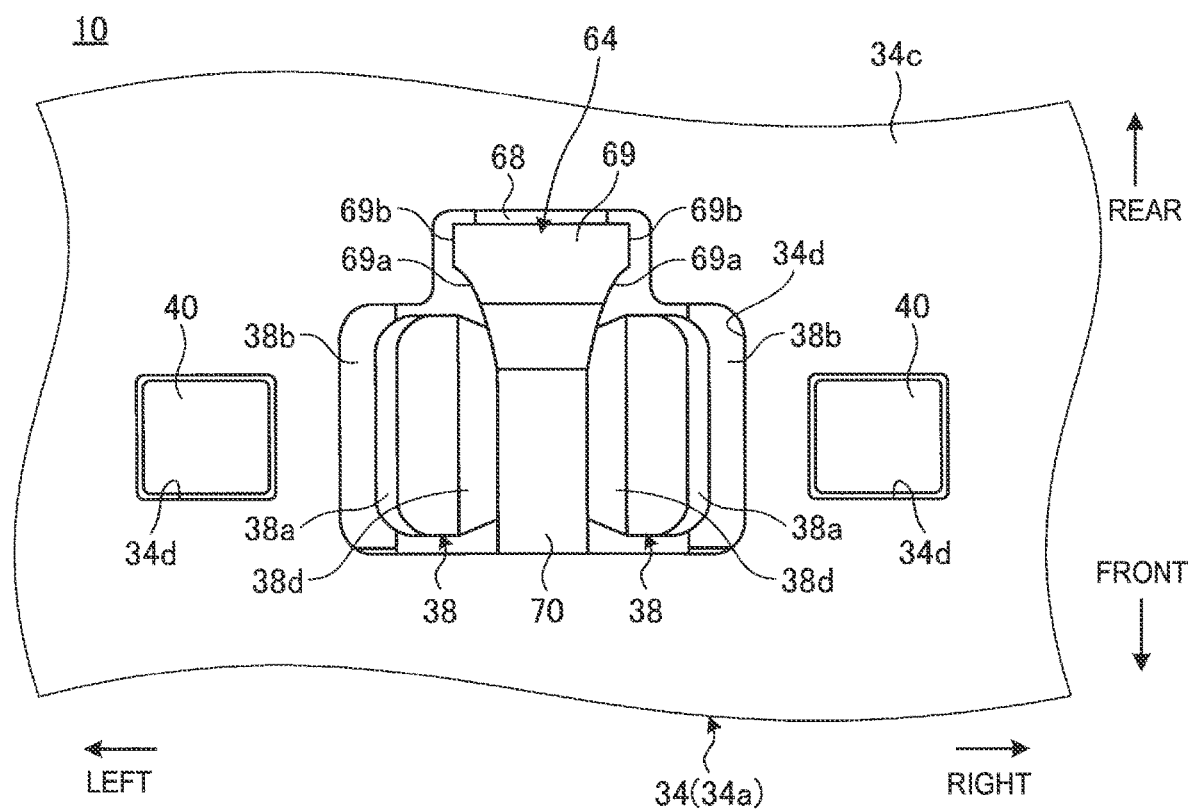
FIG. 4 is a plan view illustrating engaging members, detectors, and their peripheral portion on an enlarged scale.
Figure 5A:
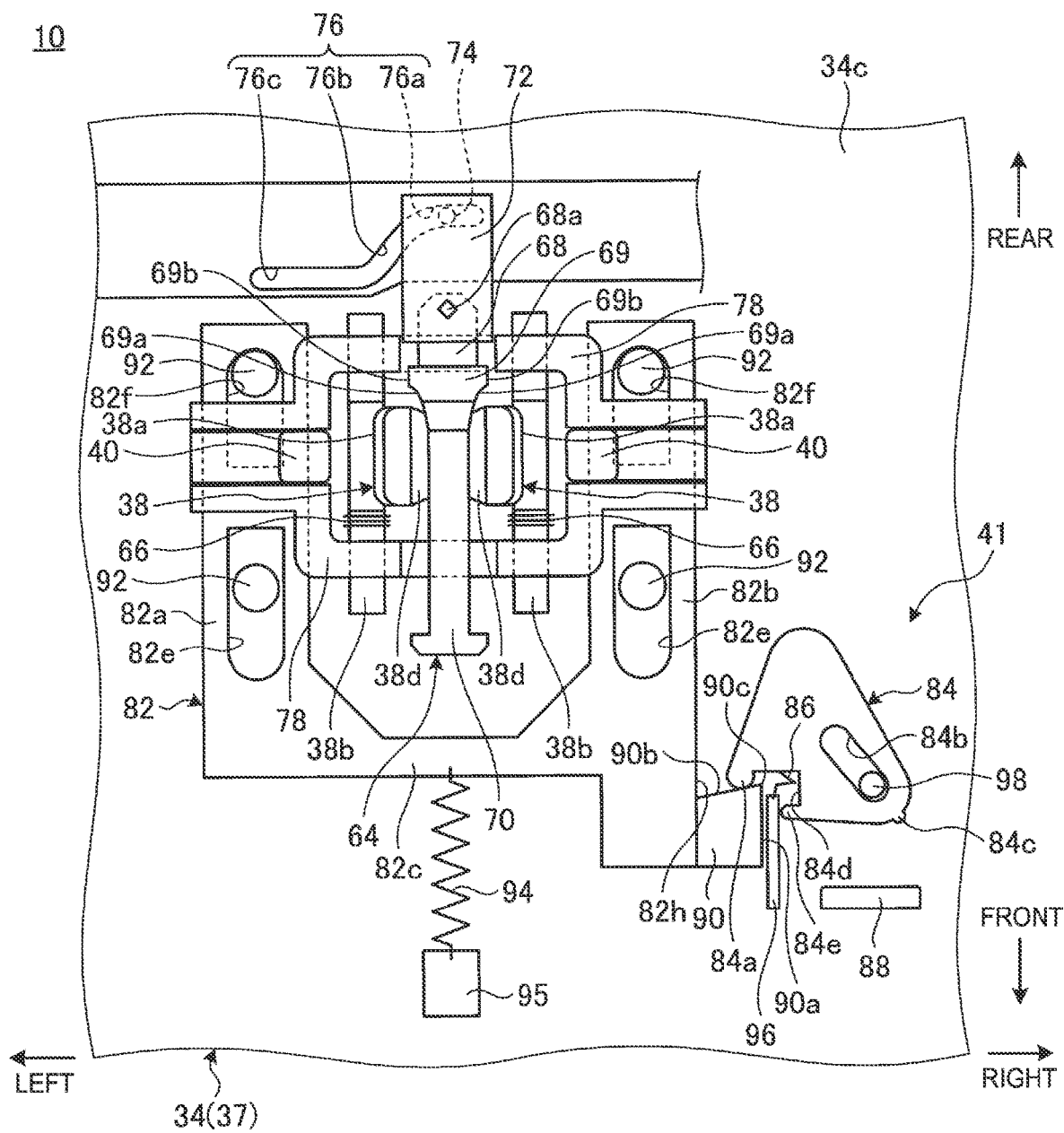
FIG. 5A is a plan view schematically illustrating the structures of the engaging members and their peripheral portion in the state in which the portable information apparatus is not docked.
Figure 5B:
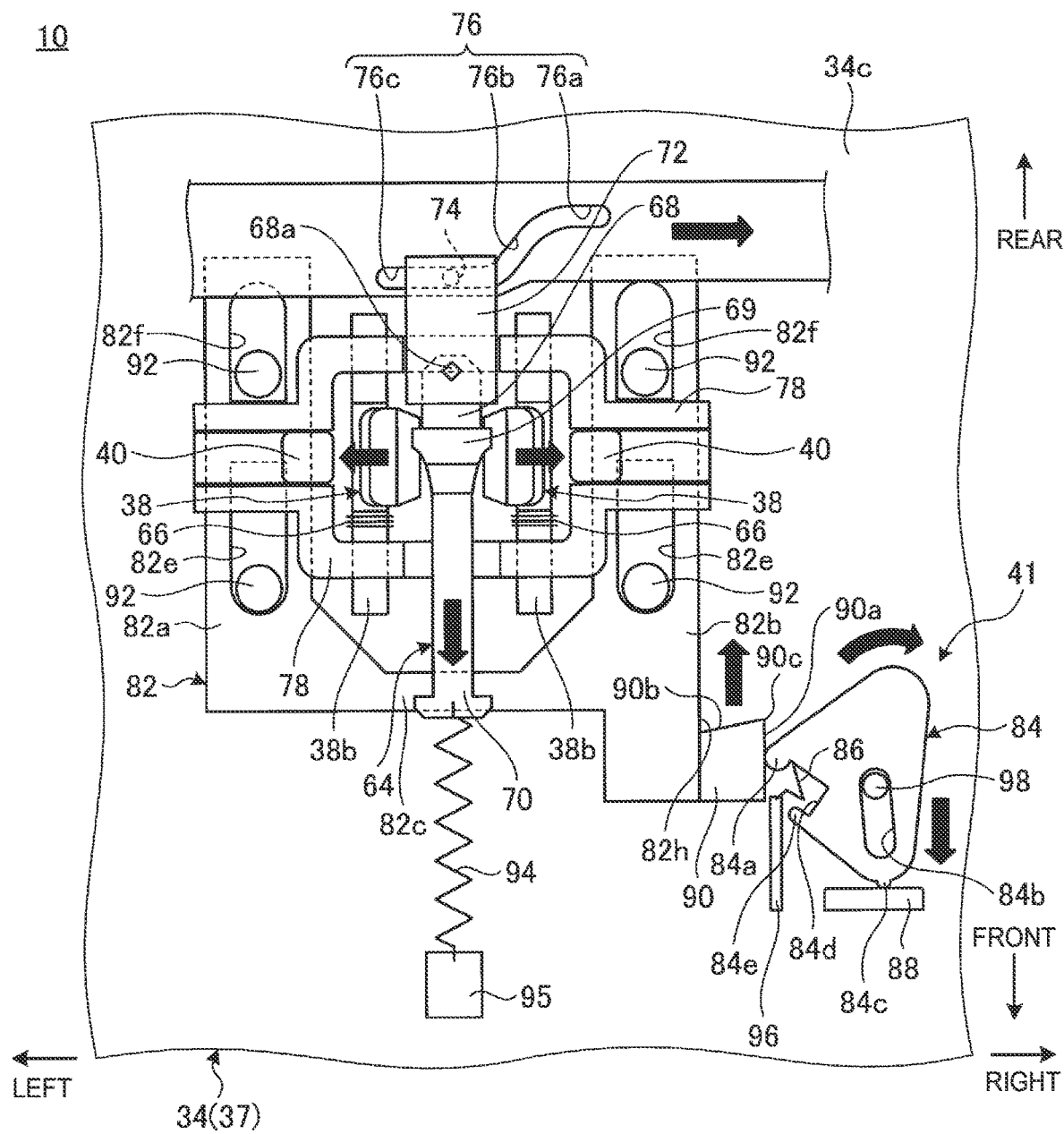
FIG. 5B is a plan view schematically illustrating the structures of the engaging members and their peripheral portion in the state in which the portable information apparatus is docked from the state illustrated in FIG. 5A.

Next, configuration examples of the engaging members 38 and the detectors 40 will be described. FIG. 4 is a plan view illustrating the engaging members 38 the detectors 40, and their peripheral portion on an enlarged scale. FIG. 5A is a plan view schematically illustrating the structures of the engaging members 38 and their peripheral portion in the state in which the portable information apparatus 12A or 12B is not docked. FIG. 5B is a plan view schematically illustrating the structures of the engaging members 38 and their peripheral portion in the state in which the portable information apparatus 12A or 12B is docked from the state illustrated in FIG. 5A. FIGS. 6A to 6D are side sectional views schematically illustrating the operations of the engaging members 38, 38 and the detectors 40 when docking the portable information apparatus 12A (12B) to the docking device 10. In FIGS. 6A to 6D, illustration of the impact sound generation mechanism 41 is omitted.

As illustrated in FIGS. 4 to 6D, the docking device 10 includes the pair of engaging members 38, the pair of detectors 40, a restricting member 64, the position adjusting mechanism 56, and the impact sound generation mechanism 41.

Each of the engaging members 38 is a hook-shaped plate-like member extending in the top-bottom direction and has a hook portion 38a, a pivot shaft 38b, a hook-side inclined surface 38c, and a receiving surface 38d. The hook portion 38a is provided at a top end portion (distal end portion) of the engaging member 38. The hook portion 38a is a triangular projecting portion that engages with and disengages from the engaging hole 14d. The pivot shaft 38b is rotatably and vertically movably supported by a bearing, not illustrated, that is provided inside the device chassis 37. The hook-side inclined surface 38c is formed on a bottom surface of the hook portion 38a. The hook-side inclined surface 38c is a surface that is gradually inclined upward toward a distal end of the hook portion 38a. At least at an engagement position illustrated in FIG. 6C or 6D, the receiving surface 38d is gradually inclined toward the hook portion 38a in the direction in which the engaging member 38 projects, i.e. in the undocking direction (upward) in which the portable information apparatus 12A (12B) is detached from the apparatus placement portion 34 in this embodiment.

The left engaging member 38 is provided with the hook portion 38a at a left end of its top end portion and with the pivot shaft 38b at a left end of its bottom end portion. The right engaging member 38 is provided with the hook portion 38a at a right end of its top end portion and with the pivot shaft 38b at a right end of its bottom end portion. The left and right engaging members 38 are disposed to be laterally symmetrical to each other, and a space for the restricting member 64 to advance and retract is provided between the receiving surfaces 38d of the left and right engaging members 38.

The hook portion 38a of each of the engaging members 38 projects upward from an opening 34d formed in the top surface 34c of the placement base 34a in the state in which the pivot shaft 38b is disposed inside the placement base 34a. In this state, each of the engaging members 38 can pivot about the pivot shaft 38b between an engagement position where the hook portion 38a engages with the engaging hole 14d and an engagement release position where the engaged state of the hook portion 38a with the engaging hole 14d is released. As illustrated in FIGS. 6A to 6D, the moving direction of the left engaging member 38 from the engagement release position to the engagement position (the engagement direction) is the left direction (the counterclockwise direction in the figures), while the moving direction thereof from the engagement position to the engagement release position (the engagement release direction) is the right direction (the clockwise direction in the figures). The engagement direction of the right engaging member 38 is the right direction (the clockwise direction in the figures), while the engagement release direction thereof is the left direction (the counterclockwise direction in the figures). Each of the engaging members 38 is constantly urged in the engagement release direction from the engagement position toward the engagement release position by a torsion coil spring 66 provided around the pivot shaft 38b (see FIG. 6A).

The restricting member 64 can advance and retract in the front-rear direction between the receiving surfaces 38d of the left and right engaging members 38. As illustrated in FIGS. 5A and 5B, the restricting member 64 is a stepped bar-like member extending in the front-rear direction and has a coupling portion 68, a restricting portion 69, and a guide portion 70 in this order from the rear toward the front. The restricting member 64 is movable between a retraction position where the restricting portion 69 retracts rearward of the space between the engaging members 38 (see FIG. 5A), and a restriction position where the restricting portion 69 enters the space between the engaging members 38 (see FIG. 5B).

The coupling portion 68 is a plate piece projecting from a rear end face of the restricting portion 69, and a coupling pin 68a is protrusively provided at a rear end portion of the coupling portion 68. The coupling pin 68a is coupled to a link plate 72. The link plate 72 has a front end portion with the coupling pin 68a inserted from the bottom surface side thereof and has a rear end portion with a link pin 74 protrusively provided on a bottom surface thereof.

The left-right slider 62 is formed with the elongated hole 76. The elongated hole 76 is a hole in which the link pin 74 is slidably inserted. The elongated hole 76 has a retraction portion 76a, a drive portion 76b, and a restriction portion 76c in this order from the advancing direction (right side) to the retracting direction (left side) of the left-right slider 62.

In the docking device 10, the left-right slider 62 slides from the left to the right in response to the operation of the operating lever 50 when connecting the connector 26 to the connection terminal 24. Then, the link pin 74 moves from the retraction portion 76a to the restriction portion 76c via the drive portion 76b in the elongated hole 76. In this event, the link pin 74 moves from the rear to the front while moving in the drive portion 76b, thus moving the restricting member 64 to the front via the link plate 72. The guide portion 70 is a bar-like portion extending forward from a front end face of the restricting portion 69. The guide portion 70 advances or retracts the restricting member 64 in the front-rear direction while being guided by a guiding component, not illustrated, that is fixed to the device chassis 37.

The restricting portion 69 is a generally trapezoidal block in plan view. The restricting portion 69 has a pair of left and right pressing surfaces 69a and a pair of left and right contact surfaces 69b provided rearward of the pressing surfaces 69a. Each of the pressing surfaces 69a is an inclined surface that is gradually inclined outward from the front toward the rear in plan view. Consequently, a front end portion of the restricting portion 69 has a tapered shape formed by the left and right pressing surfaces 69a. Each of the contact surfaces 69b is an inclined surface that is inclined to be gradually widened from the bottom toward the top (see FIGS. 6C and 6D). Specifically, each of the contact surfaces 69b is gradually inclined toward the engaging member 38 from the bottom toward the top. At the restriction position, each of the contact surfaces 69b comes in contact with the receiving surface 38d of the engaging member 38 in an inclined posture parallel to the receiving surface 38d. As illustrated in FIG. 5A, each of the contact surfaces 69b is a surface continuously extending from a rear end of the pressing surface 69a in the front-rear direction.

Figure 6A:
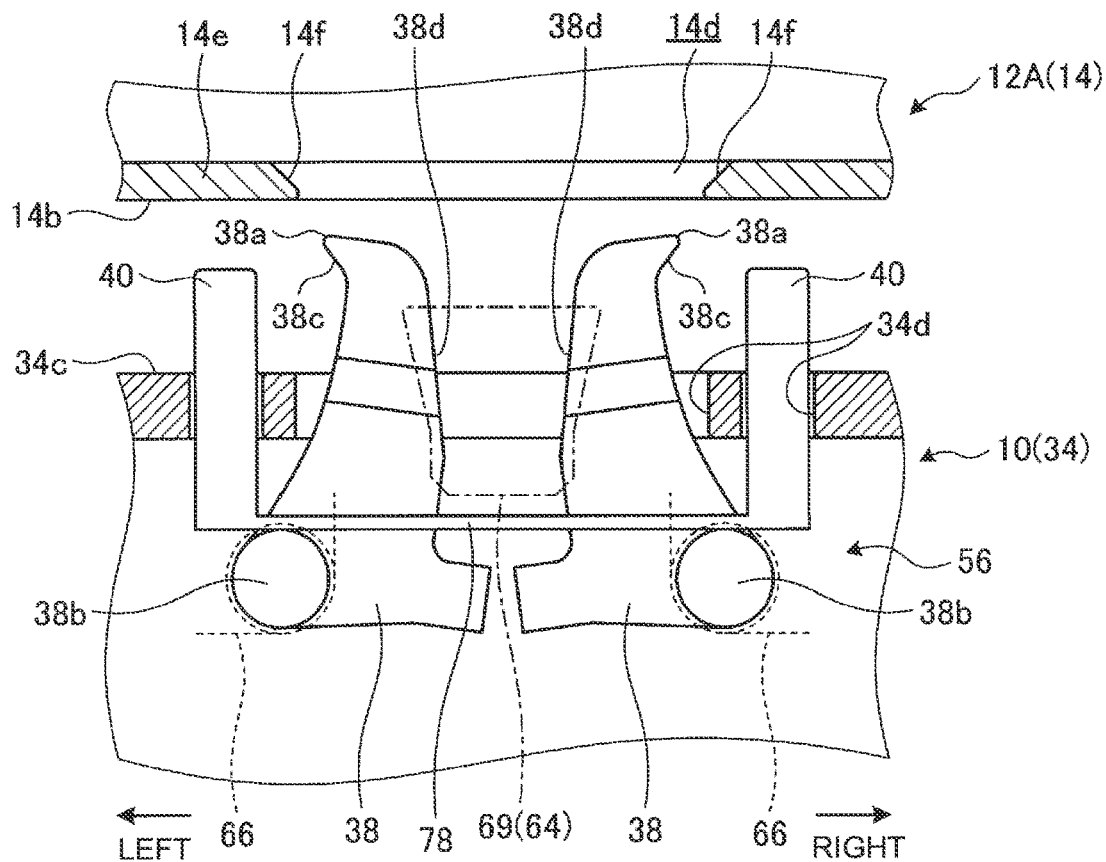
FIG. 6A is a side sectional view schematically illustrating a state of the engaging members before the portable information apparatus is docked to the docking device.
Figure 6B:
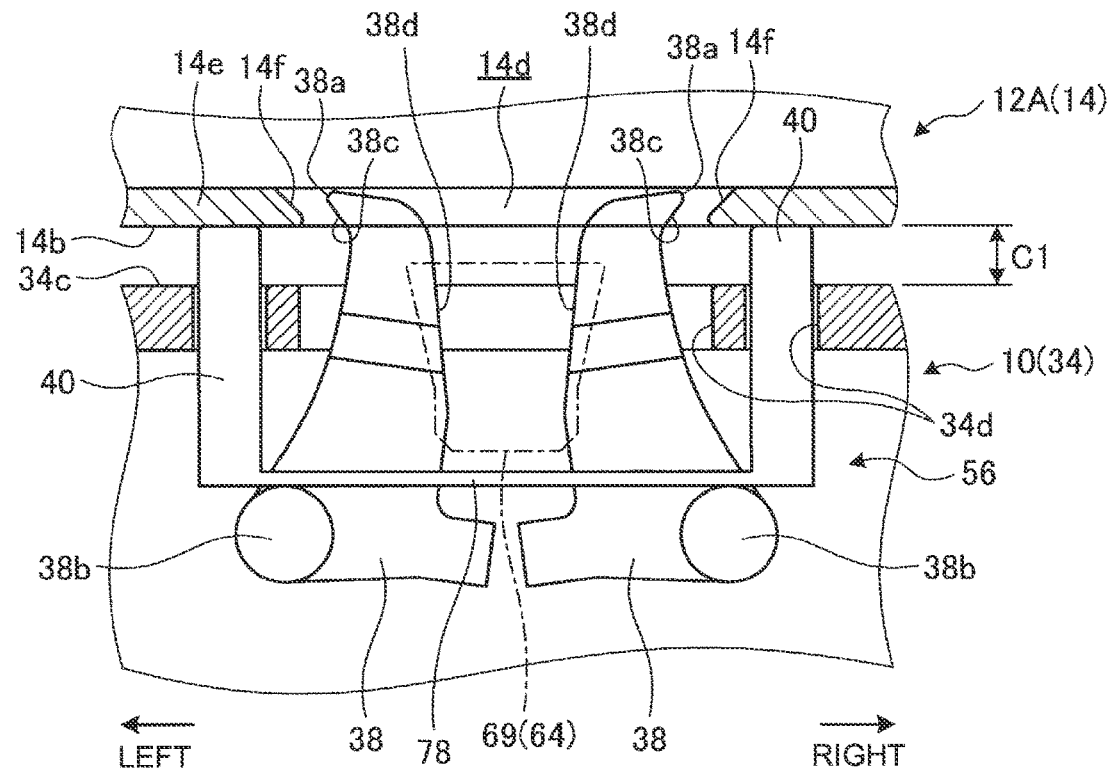
FIG. 6B is a side sectional view schematically illustrating a state in which the engaging members have entered an engaging hole from the state illustrated in FIG. 6A.
Figure 6C:
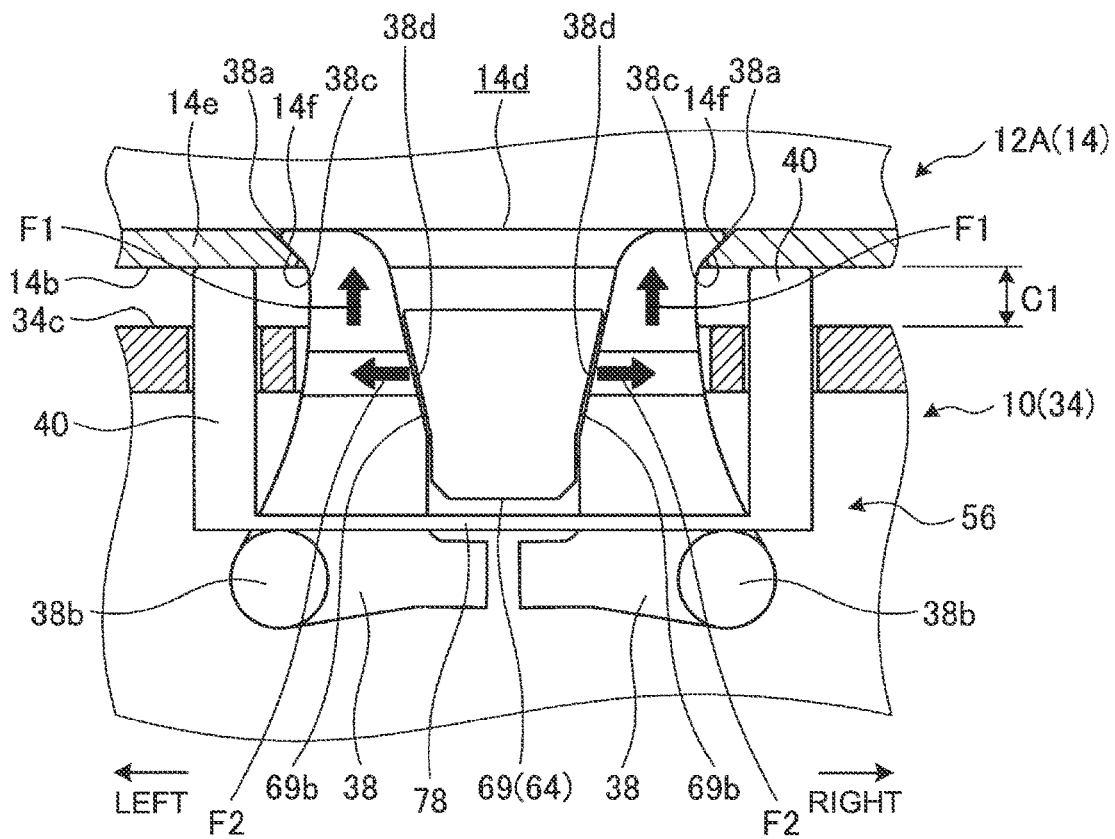
FIG. 6C is a side sectional view schematically illustrating a state in which the engaging members have engaged with the engaging hole from the state illustrated in FIG. 6B.
Figure 6D:
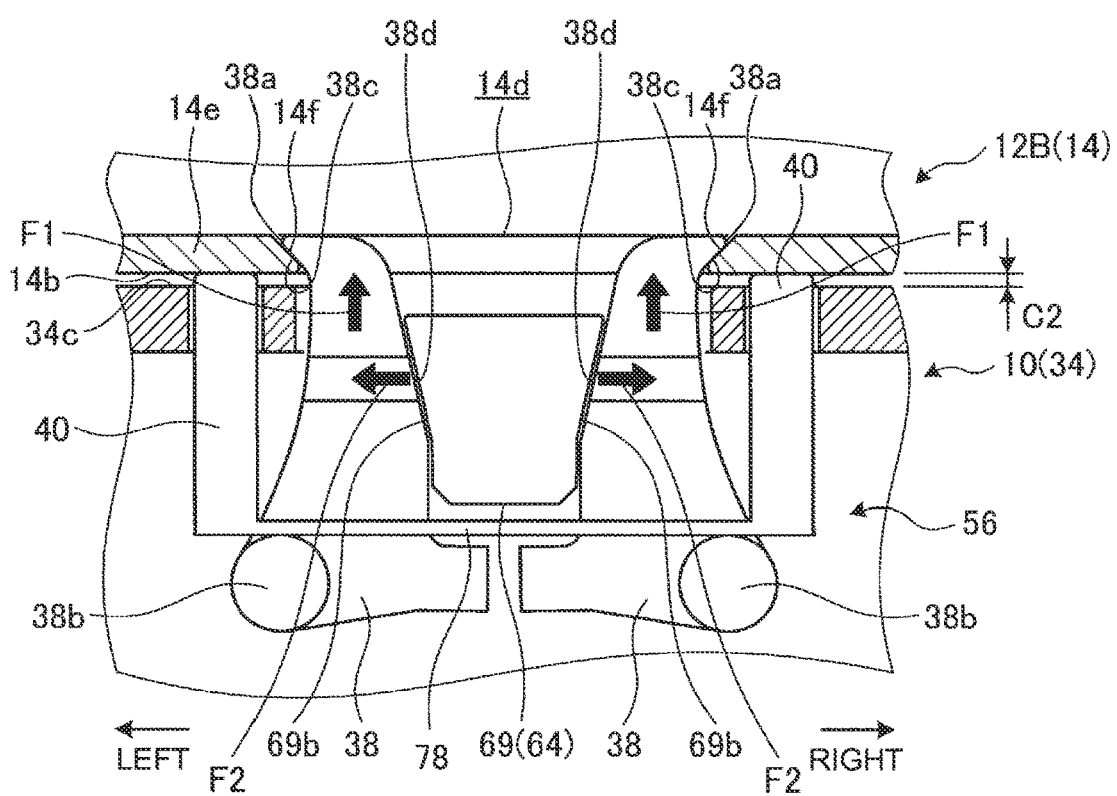
FIG. 6D is a side sectional view schematically illustrating a state in which the engaging members have engaged with an engaging hole of the portable information apparatus having the specification different from that illustrated in FIG. 6C.

At the retraction position illustrated in FIG. 5A and FIGS. 6A and 6B, the contact surfaces 69b of the restricting portion 69 of the restricting member 64 are spaced apart from the receiving surfaces 38d of the engaging members 38, thus allowing the movement of the engaging members 38 from the engagement position to the engagement release position. In this state, the front end sides of the pressing surfaces 69a of the restricting portion 69 are in slidable contact with the rear end sides of the receiving surfaces 38d of the engaging members 38. When the restricting member 64 advances from this state, the pressing surfaces 69a press the receiving surfaces 38d of the engaging members 38 while sliding on the receiving surfaces 38d. This causes the engaging members 38 to gradually move from the engagement release position to the engagement position against the urging forces of the torsion coil springs 66 (see FIGS. 6C and 6D). Then, at the restriction position illustrated in FIG. 5B and FIGS. 6C and 6D, the contact surfaces 69b of the restricting member 64 come in contact with the receiving surfaces 38d, thus restricting the movement of the engaging members 38 from the engagement position to the engagement release position.

The position adjusting mechanism 56 includes the pair of detectors 40. Each of the detectors 40 is a bar-like member extending in the top-bottom direction (see FIG. 6A). Top end portions of the detectors 40 project upward from openings 34d, and bottom end portions thereof are integrally coupled to each other via an interlocking member 78. As illustrated in FIGS. 5A to 6D, the interlocking member 78 is a frame-like member disposed to surround the left and right engaging members 38 and can come in contact with top surfaces of the pivot shafts 38b of the engaging members 38 to push the engaging members 38 downward. The interlocking member 78 interlocks the up-down movement of the detectors 40 with the advancing/retracting movement of the engaging members 38 in the top-bottom direction.

As illustrated in FIGS. 6A to 6D, the engaging holes 14d of the portable information apparatuses 12A and 12B each have a rectangular shape that enables the pair of engaging members 38 to be inserted therein and removed therefrom. The engaging hole 14d is formed in a thick portion of an outer wall 14e forming the bottom surface 14b. An inner peripheral surface of the engaging hole 14d has left and right edge portions that face the hook portions 38a of the engaging members 38, and the engaging hole 14d has hole-side inclined surfaces 14f at least at those left and right edge portions. The hole-side inclined surfaces 14f can engage with the hook-side inclined surfaces 38c provided on the hook portions 38a of the engaging members 38.

As illustrated in FIG. 1 and FIGS. 3A and 3B, the engaging member 35 disposed at the position near the connection mechanism portion 36 is a hook-shaped plate-like member having, for example, a hook portion facing forward. A coil spring 80 is attached to the engaging member 35, for example, at its bottom end portion located in the device chassis 37. The coil spring 80 constantly urges the engaging member 35 in the direction in which the hook portion moves forward. Consequently, the engaging member 35 is pushed by an edge portion of the rectangular engaging hole 14c to once retract to an engagement release position against the urging force of the coil spring 80, and then advances again to an engagement position to engage with the engaging hole 14c.

Figure 7A:
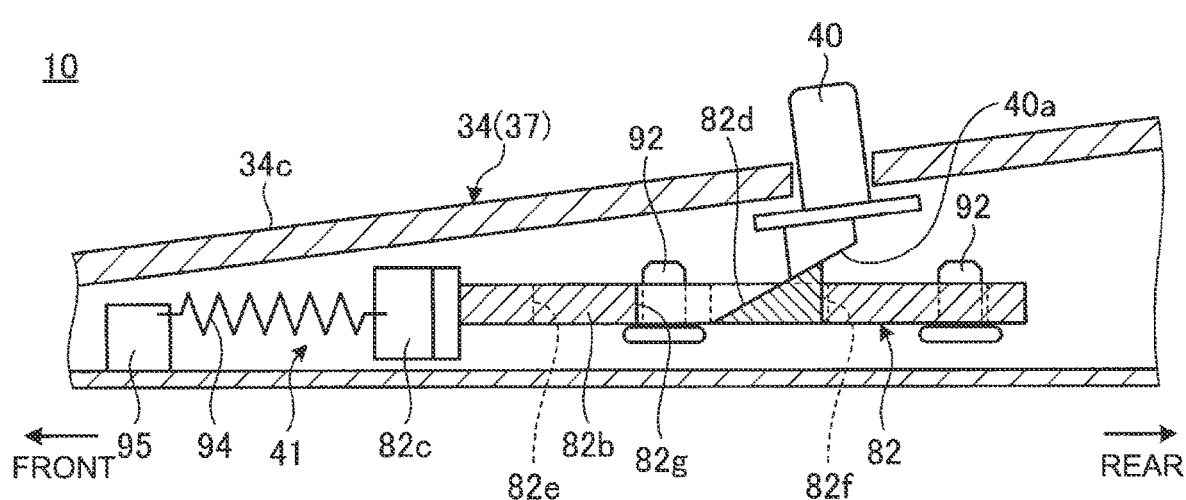
FIG. 7A is a side sectional view schematically illustrating a state of an impact sound generation mechanism in the state in which the portable information apparatus is not docked.
Figure 7B:
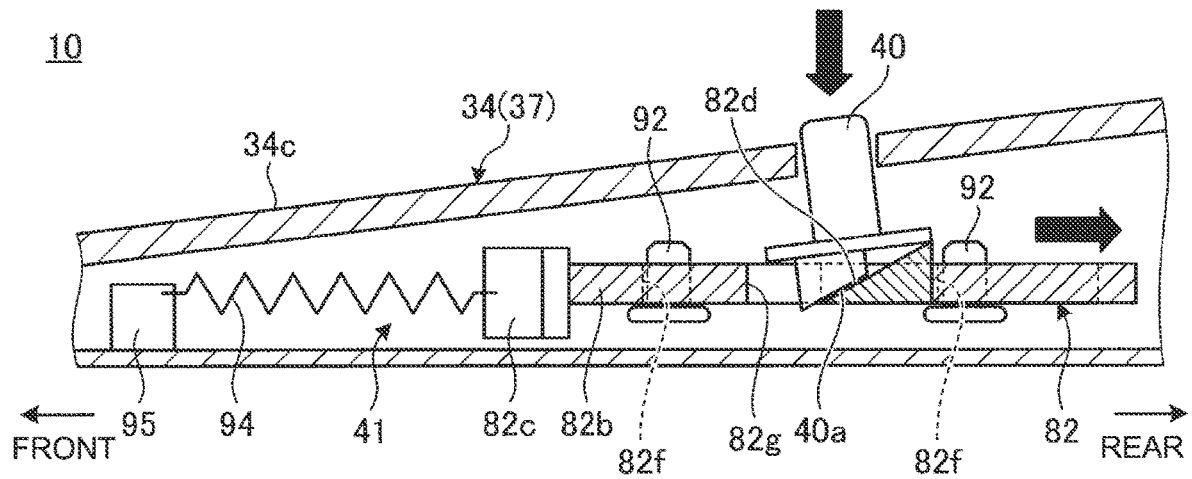
FIG. 7B is a side sectional view schematically illustrating a state of the impact sound generation mechanism in the state in which the portable information apparatus is docked from the state illustrated in FIG. 7A.

Next, the configuration of the impact sound generation mechanism 41 will be described. FIG. 7A is a side sectional view schematically illustrating a state of the impact sound generation mechanism 41 in the state in which the portable information apparatus 12A or 12B is not docked. FIG. 7B is a side sectional view schematically illustrating a state of the impact sound generation mechanism 41 in the state in which the portable information apparatus 12A or 12B is docked from the state illustrated in FIG. 7A. FIGS. 8A to 8D are main part enlarged bottom views schematically illustrating the impact sound generating operation of the impact sound generation mechanism 41, and illustrate states in which the inside of the impact sound generation mechanism 41 is viewed from the bottom surface side of the device chassis 37. In FIGS. 7A and 7B, illustration of a movable member 84 and a hitting base 88 is omitted.

Figure 8A:
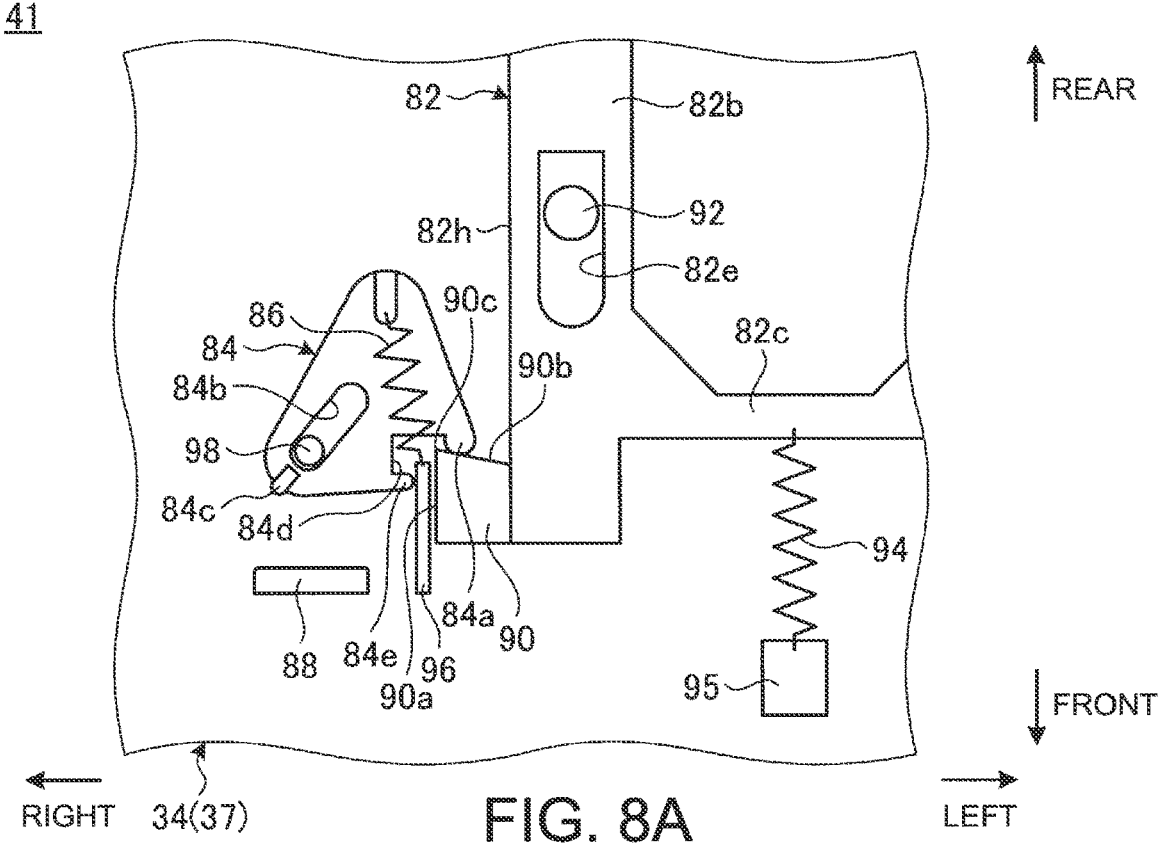
FIG. 8A is a main part enlarged bottom view schematically illustrating a state of the impact sound generation mechanism in the state in which the portable information apparatus is not docked.

The impact sound generation mechanism 41 is a device that generates an impact sound like a click sound when the portable information apparatus 12A or 12B is placed on the apparatus placement portion 34, thereby notifying a user that the portable information apparatus 12A or 12B is mounted properly. As illustrated in FIGS. 5A, 7A, and 8A, the impact sound generation mechanism 41 includes the pair of detectors 40, a front-rear slider 82, the movable member 84, an elastic member 86, and the hitting base 88.

The detectors 40 are also used in the position adjusting mechanism 56. Therefore, the number of the components of the impact sound generation mechanism 41 is limited to the minimum. In the case of this embodiment, the detectors 40 are provided in pair on the left and the right for stably performing the position adjustment of the pair of engaging members 38. The number of the detectors 40 may be one or three or more. As illustrated in FIGS. 7A and 7B, a pressing surface 40a is provided to a bottom end portion of each of the detectors 40. The pressing surface 40a is a surface that is gradually inclined downward toward the front. The pressing surface 40a is in slidable contact with a receiving surface 82d provided to the front-rear slider 82.

The front-rear slider 82 is a slide member that is in the form of a plate-like member having a generally U-shape in plan view and is supported to be slidable in the front-rear direction relative to the device chassis 37. The front-rear slider 82 includes a pair of left and right slide plates 82a, 82b, a bridge plate 82c, the receiving surfaces 82d, and a pressing piece 90.

The slide plates 82a, 82b are arranged in parallel on the left and the right, bridging the engaging members 38, and extend in the front-rear direction. Each of the slide plates 82a, 82b has a pair of front-rear elongated holes 82e, 82f. A pin 92 protrusively provided to the device chassis 37 is inserted through each of the elongated holes 82e, 82f so as to be relatively slidable. The front-rear slider 82 is supported to be slidable in the front-rear direction relative to the device chassis 37 while being guided by the pins 92. The bridge plate 82c connects between front end portions of the slide plates 82a, 82b. A rear end portion of a coil spring 94 is attached to the bridge plate 82c. A front end portion of the coil spring 94 is attached to a support portion 95 fixed to the device chassis 37. The coil spring 94 constantly urges the front-rear slider 82 toward the front.

The receiving surface 82d is provided for each of the left and right detectors 40. The receiving surface 82d is an inclined surface that extends, for example, from above each of the slide plates 82a, 82b to a position entering an opening 82g formed in each of the slide plates 82a, 82b (see FIGS. 7A and 7B). The receiving surface 82d is gradually inclined downward toward the front.

The pressing piece 90 is a plate piece projecting rightward from a right surface 82h of an extended portion of the front end portion of the right slide plate 82b. The pressing piece 90 has a restriction surface 90a and an inclined surface 90b. The restriction surface 90a is a side surface of the pressing piece 90 opposite to a side surface of the pressing piece 90 on the slide plate 82b side and extends in the front-rear direction. The front-rear slider 82 slides in the direction from the front toward the rear (the first direction) when the portable information apparatus 12A or 12B is placed, and slides in the opposite direction (the direction from the rear toward the front; the second direction) when the portable information apparatus 12A or 12B is detached. The inclined surface 90b extends from an end portion 90c of the restriction surface 90a on the rear end side (the first direction side) toward the right surface 82h of the front-rear slider 82 and is gradually inclined toward the front (the second direction side).

The movable member 84 is a plate-like member having a generally triangular shape in plan view. In the state in which the portable information apparatus 12A or 12B is not placed (the initial position) illustrated in FIGS. 5A and 8A, the movable member 84 takes a posture in which one vertex is disposed in the rear and the remaining two vertices are disposed in parallel forward of the one vertex. The movable member 84 is provided to be movable inside the device chassis 37 in the horizontal plane including the sliding direction of the front-rear slider 82. The movable member 84 has a receiving portion 84a, a guide hole 84b, and a hitting portion 84c.

The receiving portion 84a is provided on the front left of the movable member 84, i.e. at the vertex closest to the front-rear slider 82. A cut-out portion 84d recessed inward is formed at this vertex. The receiving portion 84a is provided at one edge portion of the cut-out portion 84d and has an arc shape at its distal end. At the initial position illustrated in FIGS. 5A and 8A, the receiving portion 84a is in contact with the inclined surface 90b of the pressing piece 90. In this event, the cut-out portion 84d is disposed to straddle the end portion 90c of the pressing piece 90 and a support piece 96. The support piece is a plate-like member extending in the front-rear direction and projects from the device chassis 37. A projection 84e having an arc shape at its distal end is provided at another edge portion of the cut-out portion 84d. The projection 84e faces a right surface of the support piece 96 at the initial position.

The guide hole 84b extends from the vicinity of the vertex on the front right of the movable member 84 toward the vicinity of the rear vertex thereof. At the initial position illustrated in FIGS. 5A and 8A, the guide hole 84b takes a posture in which its rear end portion (second end portion) is disposed at a position closer to the front-rear slider 82 than its front end portion (first end portion) so that the guide hole 84b is gradually inclined rightward toward the front. Therefore, the guide hole 84b is inclined relative to the sliding direction of the front-rear slider 82 at the initial position. The guide hole 84b may be configured to extend substantially in the same direction as the sliding direction of the front-rear slider 82. A guide pin 98 projecting from the device chassis 37 is inserted through the guide hole 84b to be slidable relative to the guide hole 84b. At the initial position illustrated in FIGS. 5A and 8A, the guide pin 98 is disposed at the front end portion of the guide hole 84b. At a hitting position illustrated in FIGS. 5B and 8D, the guide pin 98 is disposed at the rear end portion of the guide hole 84b.

The hitting portion 84c is a projection slightly projecting from an outer surface of the movable member 84 near the vertex on the front right thereof. The hitting portion 84c is a portion that hits the hitting base 88 provided to the device chassis 37 to generate an impact sound.

The elastic member 86 supports the movable member 84 relative to the device chassis 37. The elastic member 86 is, for example, a coil spring. At the initial position illustrated in FIGS. 5A and 8A, the elastic member 86 is disposed in a posture in which its expansion/contraction direction is inclined relative to the sliding direction of the front-rear slider 82. The elastic member 86 has a front end portion attached to a rear end of the support piece 96 of the device chassis 37, and a rear end portion attached to the movable member 84 near the rear vertex thereof. The rear end portion of the elastic member 86 is disposed at a position farther from the front-rear slider 82 than the front end portion thereof so that the elastic member 86 is gradually inclined rightward from its front end portion toward its rear end portion. It is satisfactory if the elastic member 86 takes an inclined posture in which its rear end portion is disposed at a position farther from the front-rear slider 82 than its front end portion, and there is no limitation to the angle of inclination. The elastic member 86 constantly urges the movable member 84 in the direction of pressing the receiving portion 84a of the movable member 84 against the inclined surface 90b of the pressing piece 90, i.e. constantly urges the movable member 84 substantially forward.

Next, the operation of docking the portable information apparatus 12A (12B) to the docking device 10 will be described.

In the docking device 10, in the state in which the operating lever 50 is at the initial position where the operating lever 50 has retracted to the left (see FIG. 3A), the restricting member 64 is at the retraction position where the restricting member 64 has retracted to the maximum (see FIG. 5A) so that the engaging members 38 have pivoted by the urging forces of the torsion coil springs 66 so as to be at the engagement release position (see FIG. 6A). In this state, in the impact sound generation mechanism 41, the detectors 40 are at the most raised position so that the front-rear slider 82 is at the position where the front-rear slider 82 has slid most forward by the urging force of the coil spring 94 (see FIGS. 5A and 7A). Therefore, the movable member 84 is at the initial position where the receiving portion 84a is in contact with the inclined surface 90b of the pressing piece 90 by the urging force of the elastic member 86 (see FIG. 8A). In this event, the guide pin 98 is located at the front end portion of the guide hole 84b.

When the portable information apparatus 12A is placed on the placement base 34a from this state, the detectors 40 are pushed down by the bottom surface 14b of the portable information apparatus 12A so that the position adjusting mechanism 56 operates to adjust the vertical positions of the engaging members 38. As a result, the engaging members 38 are inserted into the engaging hole 14d and disposed at a position where the engaging members 38 can engage with the engaging hole 14d (see FIG. 6B). In this event, the engaging member 35 is pushed by the edge portion of the engaging hole 14c to once retract to the engagement release position, and then advances again to engage with the engaging hole 14c (see FIG. 3B).

Simultaneously with this, the impact sound generation mechanism 41 operates. Specifically, in the impact sound generation mechanism 41, when the detectors 40 are pushed down, the pressing surfaces 40a press the receiving surfaces 82d (see FIGS. 7A and 7B). This causes the front-rear slider 82 to slide rearward (the first direction) against the urging force of the coil spring 94. When the front-rear slider 82 slides rearward, the pressing piece 90 also moves rearward so that the inclined surface 90b presses the receiving portion 84a of the movable member 84. Therefore, the movable member 84 attempts to move rearward against the urging force of the elastic member 86. However, the guide pin 98 is disposed at the front end portion of the guide hole 84b of the movable member 84. Consequently, the movable member 84 pivots about the guide pin 98 in the counterclockwise direction in FIG. 8A (see FIG. 8B) so that the receiving portion 84a slides on the inclined surface 90b to gradually move toward the end portion 90c. As a result, tensile force is given to the elastic member 86 so that energy is accumulated.

Figure 8B:
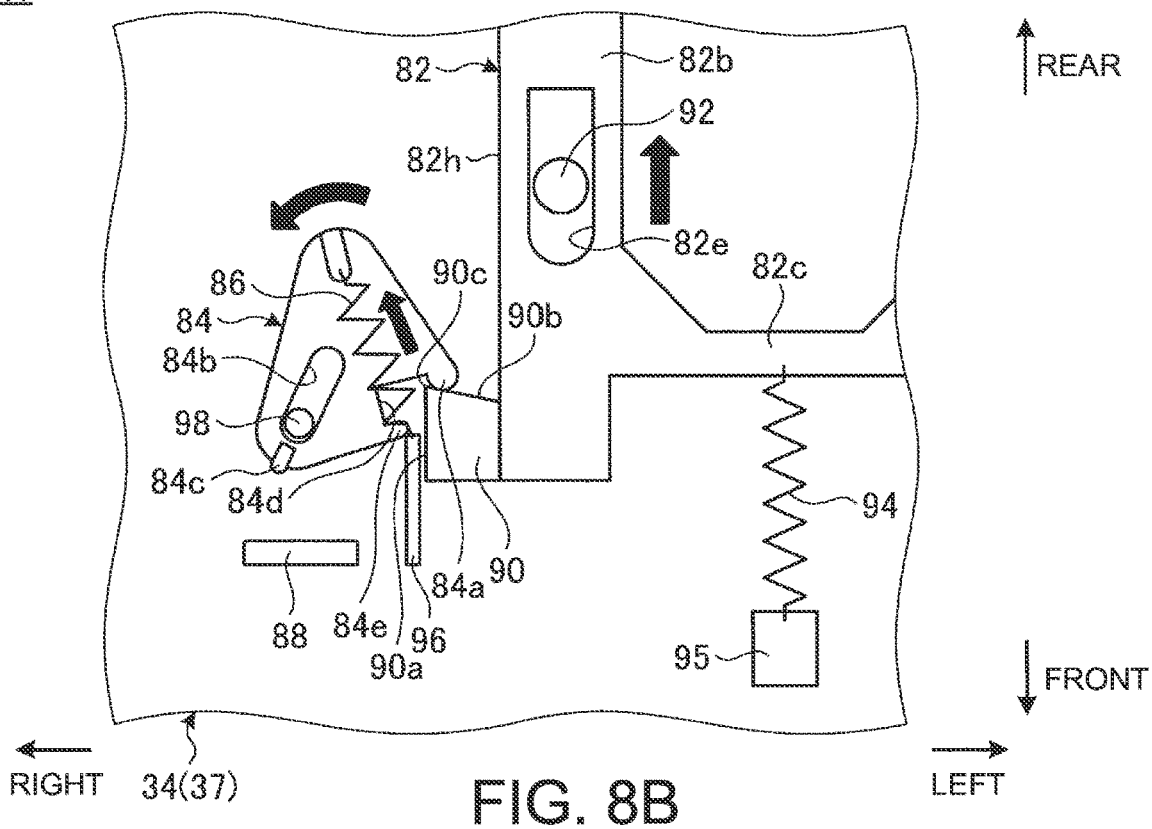
FIG. 8B is a main part enlarged bottom view schematically illustrating a state in which the portable information apparatus is placed on an apparatus placement portion from the state illustrated in FIG. 8A so that the impact sound generation mechanism has started its operation.

When the front-rear slider 82 further slides rearward from the state illustrated in FIG. 8B, the movable member 84 further pivots about the guide pin 98 in the counterclockwise direction (see FIG. 8C) so that the elastic member 86 is further expanded. Then, the receiving portion 84a reaches the end portion 90c of the inclined surface 90b (see FIG. 8C).

Figure 8C:
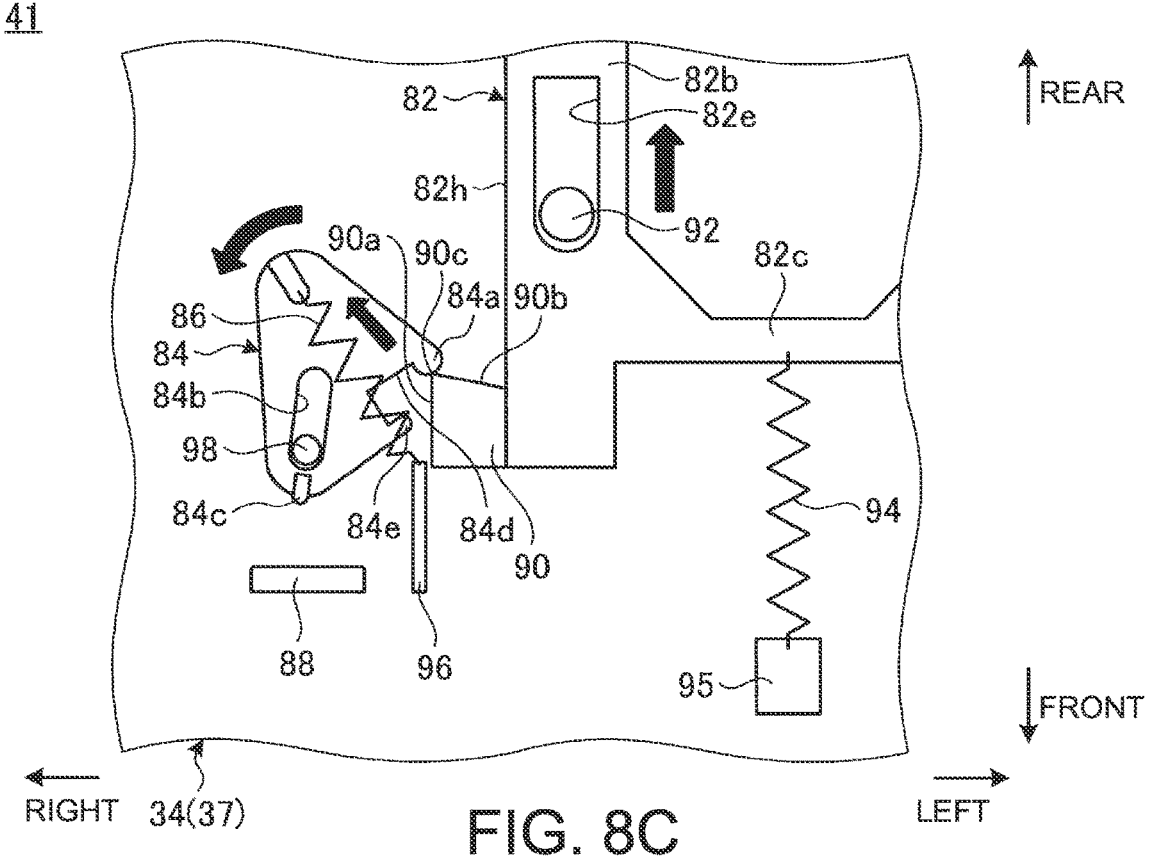
FIG. 8C is a main part enlarged bottom view schematically illustrating a state in which the impact sound generation mechanism has further operated from the state illustrated in FIG. 8B.
Figure 8D:
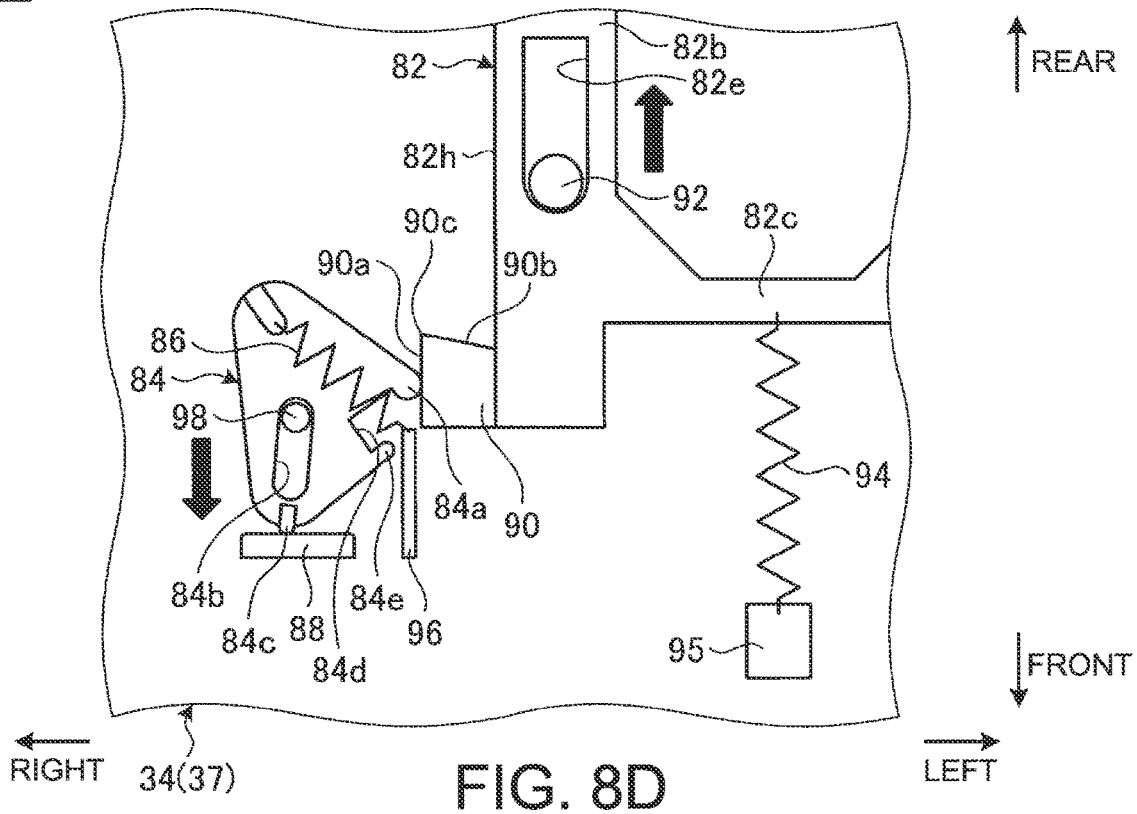
FIG. 8D is a main part enlarged bottom view schematically illustrating a state in which the impact sound generation mechanism has further operated from the state illustrated in FIG. 8C to generate an impact sound.

When the front-rear slider 82 further slides rearward from the state illustrated in FIG. 8C, the receiving portion 84a gets over the end portion 90c to disengage from the inclined surface 90b. Then, since the accumulated energy of the elastic member 86 is released, the movable member 84 moves vigorously substantially forward while being guided by the guide pin 98 (see FIG. 9D). In this event, the receiving portion 84a of the movable member 84 slides on the restriction surface 90a. As a result, the hitting portion 84c vigorously hits the hitting base 88 to generate a predetermined impact sound (hitting sound). By this impact sound, the user can easily recognize that the portable information apparatus 12A is placed properly at a predetermined mounting position, i.e. that the substantial docking operation has been completed.

Then, the user slides the operating lever 50 to the right as illustrated in FIG. 3B to connect the connector 26 to the connection terminal 24. This causes the docking device 10 to be electrically connected to the portable information apparatus 12A (12B). Simultaneously, the left-right slider 62 slides rightward to advance the restricting member 64 from the retraction position to the restriction position via the link plate 72. Consequently, the engaging members 38 move from the engagement release position to the engagement position against the urging forces of the torsion coil springs 66 (see FIG. 6C) to engage with the engaging hole 14d. In this event, the pivotal movement of the engaging members 38 in the engagement release direction is restricted by the restricting member 64. The operation of docking the portable information apparatus 12B is the same as that for the portable information apparatus 12A except that the vertical positions of the engaging members 38 are further adjusted by the operation of the position adjusting mechanism 56 illustrated in FIG. 6D.

When detaching the portable information apparatus 12A (12B) from the docking device 10, the operation that is reverse to the above-described docking operation is performed basically. Specifically, the user returns the operating lever 50 to the left, i.e. from the state illustrated in FIG. 3B to the state illustrated in FIG. 3A, to detach the connector 26 from the connection terminal 24. Then, since the left-right slider 62 returns to the left, the restricting member 64 returns from the restriction position to the retraction position. Therefore, the engaging members 38 return to the engagement release position by the urging forces of the torsion coil springs 66. Further, the engaging member 35 is moved from the engagement position to the engagement release position relative to the engaging hole 14c by a release mechanism not illustrated.

Then, the user lifts the portable information apparatus 12A (12B) from the placement base 34a. Accordingly, the downward pressing force of the portable information apparatus 12A (12B) relative to the detectors 40 is released.

Therefore, the front-rear slider 82 moves forward by the urging force of the coil spring 94 to raise the detectors 40 to the initial position via the receiving surfaces 82d. Simultaneously, the movable member 84 returns to the initial position by the urging force of the elastic member 86. As a result, the docking device 10 returns to the state before the portable information apparatus 12A (12B) is docked.

As described above, the docking device 10 of this embodiment includes the impact sound generation mechanism 41. The impact sound generation mechanism 41 includes the detectors 40 configured to detect the placement of the portable information apparatus 12A (12B) on the apparatus placement portion 34; the front-rear slider 82 provided to be slidable inside the device chassis 37 in the first direction and the second direction and configured to slide in the first direction when the portable information apparatus 12A (12B) is detected by the detectors 40; and the movable member 84 having the receiving portion 84a that is pressed by the pressing piece 90 of the front-rear slider 82 sliding in the first direction, the movable member 84 provided to be movable in the device chassis 37. The impact sound generation mechanism 41 further includes the guide hole 84b provided to the movable member 84; the guide pin 98 inserted in the guide hole 84b to be slidable relative to the guide hole 84b; the elastic member 86 disposed in the posture in which its expansion/contraction direction is inclined relative to the sliding direction of the front-rear slider 82; and the hitting base 88 provided to the device chassis 37 and configured to be hit by the hitting portion 84c provided to the outer surface of the movable member 84. The impact sound generation mechanism 41 may be configured such that the guide hole 84b is provided to the device chassis 37 and that the guide pin 98 is provided to the movable member 84.

Therefore, the docking device 10 can realize, with the simple configuration and at the low cost, the impact sound generation mechanism 41 that notifies an impact sound when the portable information apparatus 12A (12B) is placed at a predetermined mounting position.

In the meantime, there is a possibility that when placed on the apparatus placement portion 34, the portable information apparatus 12A (12B) may take a placement posture of being rotated on the top surface 34c. Then, there is a concern that only the engaging member 35 close to the connection mechanism portion 36 serving as the left-right positioning portion is disposed at an engageable position or an engagement position relative to the engaging hole 14c, while the engaging members 38 far from the connection mechanism portion 36 are out of position relative to the engaging hole 14d. In this case, if the impact sound generation mechanism 41 is disposed at a position adjacent to the engaging member 35 close to the connection mechanism portion 36, there is a concern that an impact sound is generated in such an improper placement posture to cause a user to erroneously recognize the completion of docking. Consequently, the connector 26 cannot be properly connected to the connection terminal 24.

In this regard, the docking device 10 of this embodiment includes the connection mechanism portion 36 that rises upright at the side portion of the apparatus placement portion 34 on which the portable information apparatus 12A (12B) is placed, and that is disposed to face the side surface 14a of the portable information apparatus 12A (12B) placed on the apparatus placement portion 34; the engaging member 35 and the engaging members 38 projecting from the top surface 34c of the apparatus placement portion 34; and the impact sound generation mechanism 41. Herein, the engaging members 38 are provided at the position farther from the connection mechanism portion 36 than the engaging member 35. Therefore, in the state where the engaging members 38 are located at the engageable position, it is considered that the side surface 14a of the portable information apparatus 12A (12B) is securely positioned by the side wall 48a of the connection mechanism portion 36. Further, the impact sound generation mechanism 41 is provided at the position closer to the engaging members 38 than to the engaging member 35. That is, in the docking device 10, the impact sound generation mechanism 41 is disposed at the position adjacent to the engaging members 38 located at the position far from the connection mechanism portion 36 that serves to position the side surface 14a of the portable information apparatus 12A (12B) placed on the apparatus placement portion 34. Therefore, it is possible to suppress the occurrence of erroneous operation in which the impact sound generation mechanism 41 operates in the state in which either of the engaging members 35, 38 at the two positions is not disposed at a proper engageable position or a proper engagement position.

It is apparent that the present invention is not limited to the embodiment described above and can be freely changed within the scope not departing from the spirit of the present invention.

The configuration has been described, by way of example, in which the engaging members 38 are disposed at the engageable position relative to the engaging hole 14d just after the portable information apparatus 12A (12B) is placed on the apparatus placement portion 34, and then, waiting for the sliding operation of the operating lever 50, the engaging members 38 engage with the engaging hole 14d. However, like the engaging member 35, the engaging members 38 may be configured to engage with the engaging hole 14d when the portable information apparatus 12A (12B) is placed on the apparatus placement portion 34. In the case of this configuration, the impact sound generation mechanism 41 generates an impact sound substantially simultaneously with the movement of the engaging members 38 to the engagement position. Further, it may be configured that only one of the engaging members 35, 38 is used.

The configuration has been described, by way of example, in which the connector 26 is laterally connected to the connection terminal 24 provided in the side surface 14a of the portable information apparatus 12A (12B). However, the portable information apparatus 12A (12B) may be configured to have the connection terminal 24 in the bottom surface 14b, and the docking device 10 may be configured to have the connector 26 in the top surface 34c of the apparatus placement portion 34.

The invention claimed is:

1. A docking device capable of docking a portable information apparatus having an outer wall formed with an engaging hole, the docking device comprising:
a device chassis having an apparatus placement portion for placement of the portable information apparatus;
an engaging member having a hook portion projecting from a surface of the apparatus placement portion and configured to engage with and disengage from the engaging hole of the portable information apparatus, the hook portion being movable between an engagement position in which the hook portion engages with the engaging hole and an engagement release position in which a state of engagement of the hook portion with the engaging hole is released; and
an impact sound generation mechanism configured to generate an impact sound when the portable information apparatus is placed on the apparatus placement portion and the engaging member is disposed at a position engageable with the engaging hole or at the engagement position,
the impact sound generation mechanism including:
a detector configured to detect that the portable information apparatus is placed on the apparatus placement portion;
a slide member that is slidable in the device chassis in a first direction and a second direction opposite to the first direction, and is configured to slide in the first direction when the portable information apparatus is detected by the detector;
a movable member having a receiving portion configured to be pressed by a pressing piece of the slide member sliding in the first direction, the movable member configured to be movable in the device chassis;
a guide hole in one of the movable member and the device chassis;
a guide pin in the other of the movable member and the device chassis, and inserted in the guide hole to be slidable relative to the guide hole;
an elastic member having one end attached to the device chassis and an other end attached to the movable member, the other end disposed at a position farther from the slide member than the one end so that the elastic member is disposed in a posture in which an expansion/contraction direction of the elastic member is inclined relative to a sliding direction of the slide member; and
a hitting base in the device chassis and configured to be hit by a hitting portion in an outer surface of the movable member,
wherein, in the impact sound generation mechanism, when the portable information apparatus is detected by the detector, the slide member slides in the first direction to cause the pressing piece to press the receiving portion and to move the movable member against an urging force of the elastic member, and then when the pressing piece disengages from the receiving portion, the movable member moves along the guide pin by receiving the urging force of the elastic member so that the hitting portion hits the hitting base to generate the impact sound.

2. The docking device according to claim 1, wherein:
the guide hole extends in the sliding direction of the slide member or a direction inclined to the sliding direction;
the guide pin is disposed at a first end portion of the guide hole in a state when the portable information apparatus is not detected by the detector; and
while the slide member slides in the first direction, the movable member pivots about the guide pin disposed at the first end portion until the pressing piece disengages from the receiving portion, and when the pressing piece disengages from the receiving portion, the movable member moves in a direction to move the guide pin in the guide hole from the first end portion toward a second end portion opposite to the first end portion.

3. The docking device according to claim 2, wherein, when the portable information apparatus is not detected by the detector, the second end portion is disposed at a position closer to the slide member than the first end portion so that the guide hole extends in the direction inclined to the sliding direction of the slide member.

4. The docking device according to claim 1, wherein:
the pressing piece projects from a side surface of the slide member;
the pressing piece has a restriction surface along the sliding direction and an inclined surface extending from an end portion, in the first direction, of the restriction surface toward the side surface of the slide member and gradually inclined in the second direction; and
the receiving portion is in contact with the inclined surface from when the slide member starts moving in the first direction until the slide member moves a predetermined distance, and when the slide member moves the predetermined distance, the receiving portion gets over the end portion, in the first direction, of the restriction surface and disengages from the inclined surface.

5. The docking device according to claim 1, further comprising a connection mechanism portion that rises at a side portion of the apparatus placement portion and is disposed to face a side surface of the portable information apparatus placed on the apparatus placement portion,
wherein the connection mechanism portion includes a connector that is disposed to be connectable to a connection terminal at the side surface of the portable information apparatus when the engaging member is disposed at the position engageable with the engaging hole in a bottom surface of the portable information apparatus or at the engagement position.

6. The docking device according to claim 5, wherein:
the connector is configured to advance or retract from a side wall of the connection mechanism portion that faces the side surface of the portable information apparatus; and
the side wall is configured to position the side surface of the portable information apparatus.

7. The docking device according to claim 6, further comprising a second engaging member projecting from the surface of the apparatus placement portion and at a position closer to the connection mechanism portion than the engaging member,
wherein:
the second engaging member is engageable with a second engaging hole in the bottom surface of the portable information apparatus; and
the detector is at a position closer to the engaging member than to the second engaging member.

8. The docking device according to claim 1, wherein:
the engaging member and the detector are configured to be movable up and down from the surface of the apparatus placement portion; and
the detector moves up and down by being pressed by the bottom surface of the portable information apparatus placed on the apparatus placement portion, the detector causing the engaging member to move up and down so that the detector also functions as a position adjuster configured to adjust the hook portion of the engaging member to a height position engageable with the engaging hole.

* * * * *